(12) United States Patent
Suh et al.

(10) Patent No.: US 12,250,568 B2
(45) Date of Patent: Mar. 11, 2025

(54) METHOD AND APPARATUS FOR REDUCING INTERFERENCE EFFECTS IN WIRELESS COMMUNICATION SYSTEMS

(71) Applicant: LG ELECTRONICS INC., Seoul (KR)

(72) Inventors: Yonghak Suh, Seoul (KR); Woochan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 17/666,909

(22) Filed: Feb. 8, 2022

(65) Prior Publication Data

US 2023/0254708 A1    Aug. 10, 2023

(51) Int. Cl.
| | |
|---|---|
| *H04W 24/10* | (2009.01) |
| *H04B 7/06* | (2006.01) |
| *H04B 17/336* | (2015.01) |
| *H04W 16/28* | (2009.01) |

(52) U.S. Cl.
CPC .......... *H04W 16/28* (2013.01); *H04B 7/0617* (2013.01); *H04B 17/336* (2015.01); *H04W 24/10* (2013.01)

(58) Field of Classification Search
CPC ..... H04W 16/28; H04W 24/10; H04W 92/18; H04B 7/0617; H04B 17/336; H04B 7/063; H04B 7/0632; H04B 7/06954; H04B 17/345

See application file for complete search history.

(56) References Cited

U.S. PATENT DOCUMENTS

| 2018/0041270 A1* | 2/2018 | Buer ................... H04W 56/001 |
| 2021/0084655 A1* | 3/2021 | Estevez ............... H04B 7/0408 |
| 2021/0167877 A1* | 6/2021 | Choi ................... H04B 17/345 |
| 2022/0069889 A1* | 3/2022 | Zhang .................. H04B 7/088 |

\* cited by examiner

*Primary Examiner* — Lakeram Jangbahadur
(74) *Attorney, Agent, or Firm* — LEE, HONG, DEGERMAN, KANG & WAIMEY

(57) ABSTRACT

The present disclosure may provide a method for operating a UE in a wireless communication system. Herein, the method may include: transmitting, by a first UE, information necessary for beam pattern determination to a base station; receiving, from a base station, candidate beam pattern information determined based on the information necessary for beam pattern determination; receiving, from the base station, beam pattern information that the base station determined based on a measurement result for candidate beams, which are sequentially transmitted according to the candidate beam pattern information; and performing uplink transmission based on the determined beam pattern information, wherein the measurement result may include residual self-interference (SI) information measured for each of the candidate beams, which the first UE transmits, and cross link interference (CLI) information that a second UE measures for the each of the candidate beams transmitted from the first UE.

11 Claims, 24 Drawing Sheets

METHOD AND APPARATUS FOR REDUCING INTERFERENCE EFFECTS IN WIRELESS COMMUNICATION SYSTEMS

BACKGROUND OF THE INVENTION

Field of the Invention

The present disclosure relates to a wireless communication system supporting full duplex radio (FDR) and, more particularly, to a method and apparatus for reducing interference effects by determining a beam pattern based on sensor information of a terminal in a wireless communication system.

Description of the Related Art

A wireless communication system refers to a multiple access system supporting communication with multiple users by sharing available system resources (e.g., bandwidth, transmit power, etc.). Examples of the multiple access system include a code division multiple access (CDMA) system, frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication method of establishing a direct link between user equipments (UEs) and directly exchanging voice or data between the UEs without a base station (BS). SL is being considered as a method of solving the burden of the base station according to rapidly increasing data traffic.

In addition, the base station may allocate resources for uplink signals or resources for downlink signals to the UE or a vehicle. The base station may allocate the resources for the uplink signals to the UE or the vehicle through uplink control information (UCI) or allocate the resources for the downlink signals to the UE or the vehicle through downlink control information (DCI).

Meanwhile, as more communication devices require larger communication capacity, there is a need for improved mobile broadband communication as compared to existing radio access technology (RAT). Therefore, a communication system considering a service or UE sensitive to reliability and latency is being discussed. Next-generation radio access technology considering massive machine type communication (MTC) or ultra-reliable and low latency communication (URLLC) may be referred to as new radio access technology (RAT) or new radio (NR).

SUMMARY

The present disclosure relates to a method and apparatus for reducing interference effects in a full-duplex radio (FDR) communication system.

The present disclosure relates to a method and apparatus for determining a beam pattern based on sensor information of a terminal in an FDR communication system.

The present disclosure relates to a method and apparatus for determining a beam pattern based on residual self-interference (SI) and cross-link interference (CLI) in an FDR communication system.

The present disclosure relates to a method and apparatus for minimizing interference effects by determining a beam pattern based on residual SI and CLI in an FDR communication system.

The present disclosure relates to a method and apparatus for exchanging, by a terminal and a base station, a signal for determining a beam pattern in an FDR communication system.

The technical objects to be achieved in the present disclosure are not limited to the above-mentioned technical objects, and other technical objects that are not mentioned may be considered by those skilled in the art through the embodiments described below.

In an embodiment of the present disclosure, a method for operating a terminal in a wireless communication system may be provided. Herein, the method may include: transmitting, by a first terminal, information necessary for beam pattern determination to a base station; receiving, from the base station, candidate beam pattern information determined based on the information necessary for beam pattern determination; receiving, from the base station, beam pattern information that the base station determines based on a measurement result for candidate beams, which are sequentially transmitted according to the candidate beam pattern information; and performing uplink transmission based on the determined beam pattern information. Herein, the measurement result may include residual self-interference (SI) information, which the first terminal transmits and is measured for each of the candidate beams, and cross link interference (CLI) information that the second terminal measures for each of the candidate beams transmitted from the first terminal.

Also, in an embodiment of the present disclosure, a method for operating a base station in a wireless communication system may be provided. Herein, the method may include: requesting, by the base station, information necessary for beam pattern determination to a first terminal and a second terminal; receiving, from the first terminal and the second terminal, the information necessary for beam pattern determination; determining candidate beam pattern information based on the received information necessary for beam pattern determination; transmitting, to the first terminal, the determined candidate beam pattern information; receiving, from the first terminal and the second terminal, measurement information for each candidate beam transmitted according to the determined candidate beam pattern information; determining a beam pattern based on the measurement information; and transmitting, to the first terminal, information on the determined beam pattern. Herein, the measurement result may include residual self-interference (SI) information, which the first terminal transmits and is measured for each of the candidate beams, and cross link interference (CLI) information that the second terminal measures for each of the candidate beams transmitted from the first terminal.

Also, in an embodiment of the present disclosure, a terminal of a wireless communication system may include a transceiver and a processor coupled to the transceiver. Herein, the processor may be configured to: transmit information necessary for beam pattern determination to a base station; receive, from the base station, candidate beam pattern information determined based on the information necessary for beam pattern determination; receive, from the base station, beam pattern information that the base station determines based on a measurement result for candidate beams, which are sequentially transmitted according to the candidate beam pattern information; and perform uplink transmission based on the determined beam pattern information. Herein, the measurement result may include residual self-interference (SI) information, which the first terminal transmits and is measured for each of the candidate beams, and cross link interference (CLI) information that the second terminal measures for each of the candidate beams transmitted from the first terminal.

Also, the following is commonly applicable to a terminal and a terminal operation method.

Also, in an embodiment of the present disclosure, the first terminal may be a terminal that has an interference effect on another terminal by performing uplink transmission, and the second terminal may be a terminal that is subject to an interference effect due to a transmission signal of another terminal.

Also, in an embodiment of the present disclosure, the information necessary for beam pattern determination may include at least one of sensor information, which includes global positioning system (GPS) location information of the first terminal and the second terminal and azimuth information generated by a gyroscope, and beam pattern information determined based on SI.

Also, in an embodiment of the present disclosure, the beam pattern information determined based on the SI may include, among beam indexes with residual SI values that do not exceed a preset threshold among transmission beams that the first terminal is capable of transmitting, information on top N transmission beams determined in an ascending order of interference effects or information on bottom N transmission beams determined in a descending order of effective interference caused by measured residual SI, and N may be an integer.

Also, in an embodiment of the present disclosure, based on the request of the base station, a time stamp of the sensor information may be transmitted together with the sensor information, a weight of the sensor information may be determined based on the time stamp, and the base station may determine the candidate beam pattern by considering the weight of the sensor information.

Also, in an embodiment of the present disclosure, when a time interval between the time stamp of the sensor information and a time where the base station requests beam switching to a terminal exceeds a preset time value, the weight of the sensor information may be lowered and be used for beam pattern determination.

Also, in an embodiment of the present disclosure, the base station may determine the candidate beam pattern by considering an interference effect degree predicted based on uplink power of the first terminal and a distance between the first terminal and the second terminal. Also, in an embodiment of the present disclosure, when receiving, from the base station, a CLI measurement start flag attribute, a sensor information request attribute and a Tx beam candidate index (SI) request attribute, the first terminal may transmit the information necessary for beam pattern determination to the base station.

Also, in an embodiment of the present disclosure, the CLI measurement start flag attribute, the sensor information request attribute and the Tx beam candidate index (SI) request attribute may be indicated by a value of either true or false.

Also, in an embodiment of the present disclosure, the first terminal and the second terminal may be all the terminals within a single cell.

The following effects may be produced by embodiments based on the present disclosure.

According to the present disclosure, communication quality may be improved by reducing interference effects in a full-duplex radio (FDR) communication system.

According to the present disclosure, interference effects between terminals may be reduced by determining a beam pattern based on sensor information of terminal in an FDR communication system.

According to the present disclosure, interference effects may be reduced and communication performance may be improved by determining a beam pattern based on self-interference (SI) and cross link interference (CLI) in an FDR communication system.

According to the present disclosure, communication quality may be improved by providing a method and apparatus for exchanging, by a terminal and a base station, a signal for determining a beam in an FDR communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
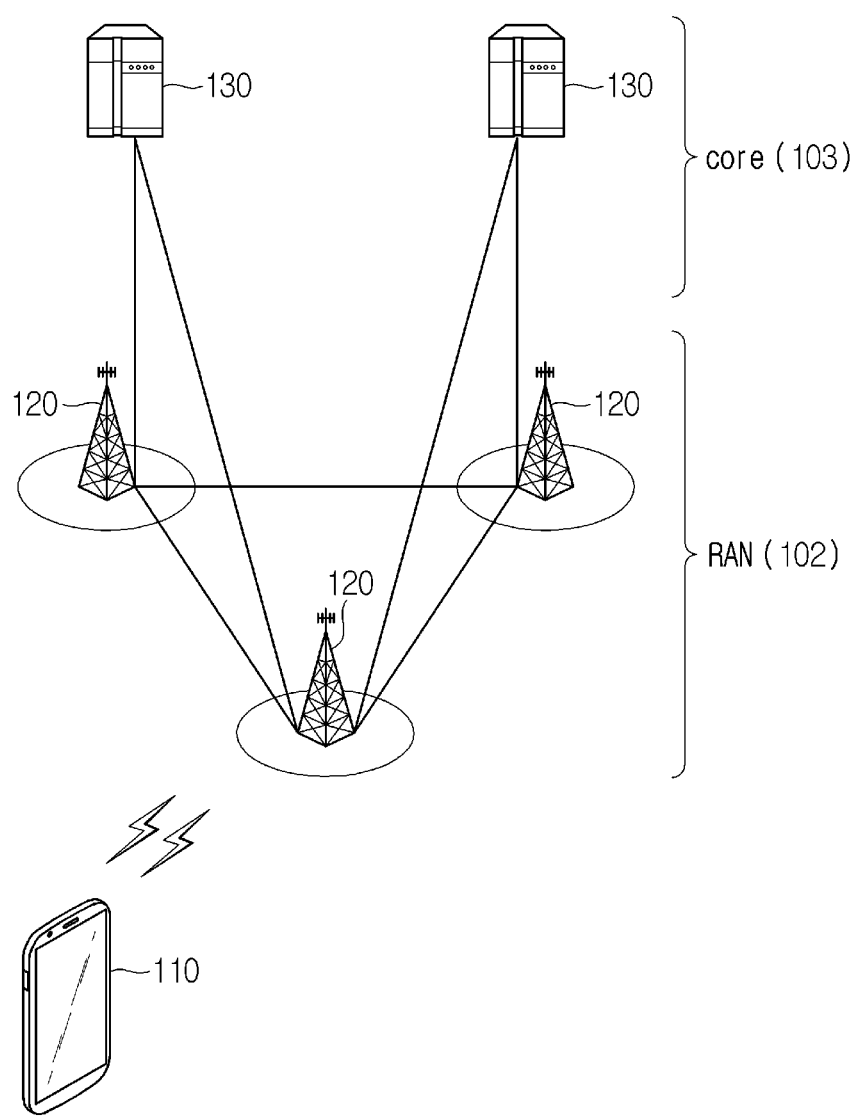
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/ er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A, "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if or in case of" may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, 3GPP TS36.XXX, 3GPP TS37.XXX and 3GPP38.XXX documents may be referenced.

Communication System Applicable to the Present Disclosure

FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a terminal 110 with a control plane and a user plane. The terminal 110 may be fixed or mobile and may be referred to as the other term such as user equipment (UE), mobile station (MS), subscriber station (SS), mobile subscriber station (MSS), mobile terminal or advanced mobile station (AMS), wireless device or the like. The base station 120 is a node for providing a radio access service to the terminal 110 and may be referred to as the other term such as a fixed station, a Node B, a eNode B (eNB), a gNode B (gNB), a ng-eNB, an advanced base station (ABS) or an access point (AP), a base transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the terminal or information on the capabilities of the terminal, and such information is mainly used for mobility management of the terminal. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a terminal unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Radio Resource Structure

Figure 2:
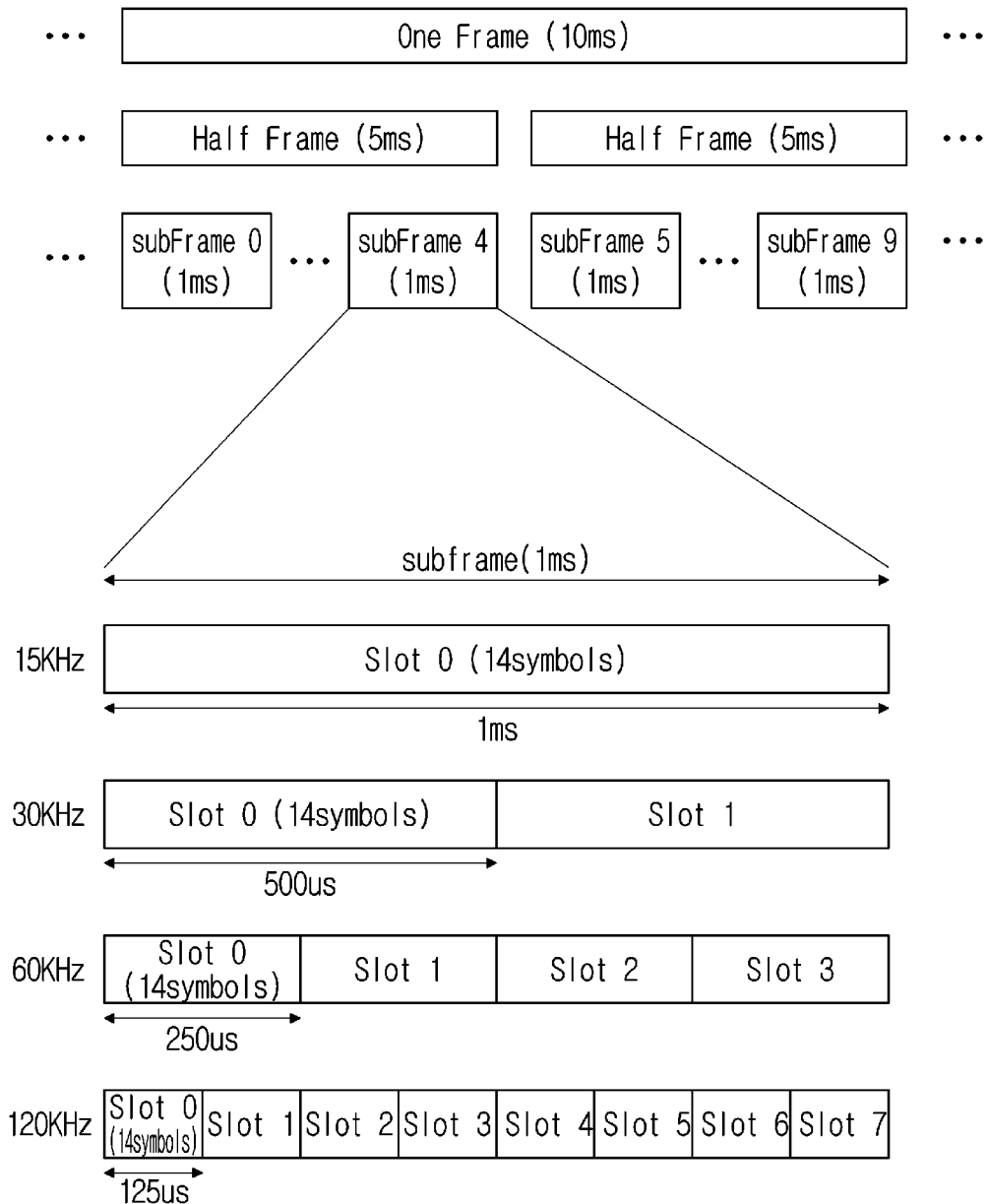
FIG. 2 illustrates the structure of a radio frame of NR according to an embodiment of the present disclosure.

FIG. 2 illustrates the structure of a radio frame of NR according to an embodiment of the present disclosure. The embodiment of FIG. 2 may be combined with various embodiments of the present disclosure.

Referring to FIG. 2, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier-FDMA) symbol (or a DFT-s-OFDM (Discrete Fourier Transform-spread-OFDM) symbol).

When the normal CP is used, the number $N^{slot}_{symb}$ of symbols per slot, the number $N^{frame,u}_{slot}$ of slots per frame and the number $N^{frame,u}_{slot}$ of slots per subframe may vary according to the SCS configuration (u). For example, SCS (=15*2^u), $N^{slot}_{symb}$, $N^{frame,u}_{slot}$, and $N^{subframe,u}_{slot}$ may be 15 KHz, 14, 10 and 1 in the case of u=0, may be 30 KHz, 14, 20 and 2 in the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS(=15*2^u), $N^{slot}_{symb}$, $N^{frame,u}_{slot}$, and $N^{subframe,u}_{slot}$ may be 60 KHz, 12, 40 and 4 in the case of u=2. In the NR system, an OFDM(A) numerology (e.g., SCS, CP length, etc.) may be differently set among a plurality of cells merged into one terminal. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHz. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHz, etc.) or higher. For example, a frequency band of 6 GHz (or 5850, 5900, 5925 MHz, etc.) included in FR1 may include an unlicensed band. The unlicensed band may be used for various purposes and may be used, for example, for vehicle communication (e.g., autonomous driving).

Figure 3:
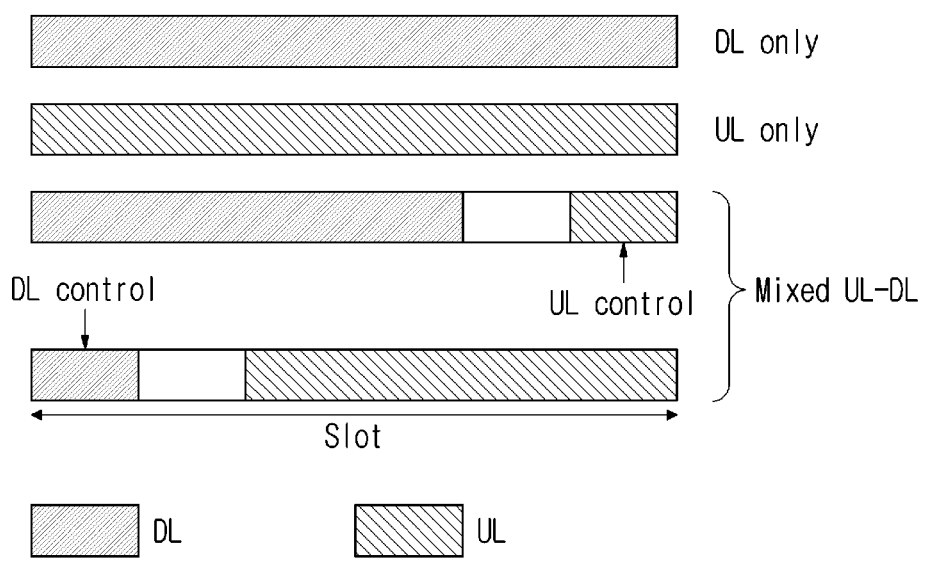
FIG. 3 illustrates the structure of a self-contained slot according to an embodiment of the present disclosure.

FIG. 3 illustrates the structure of a self-contained slot according to an embodiment of the present disclosure.

In the NR system, a frame is characterized by a self-contained structure in which a DL control channel, DL or UL data, a UL control channel, etc. may all be included in one slot. For example, the first N symbols in the slot may be used to transmit a DL control channel (hereinafter referred to as a DL control region) and the last M symbols in the slot may be used to transmit a UL control channel (hereinafter referred to as a UL control region). N and M are integers of 0 or more. A resource region (hereinafter referred to as a data region) between a DL control region and a UL control region may be used for DL data transmission or UL data transmission. For example, the following configurations may be considered. Durations was listed in chronological order.

1. DL only configuration
2. UL only configuration
3. Mixed UL-DL configuration
    DL region+GP (Guard Period)+UL control region
    DL control region+GP+UL region
        DL region: (i) DL data region, (ii) DL control region+DL data region
        UL region: (i) UL data region, (ii) UL data region+UL control region A PDCCH may be transmitted in the DL control region and a PDSCH may be transmitted in the DL data region. A PUCCH may be transmitted in the UL control region and a PUSCH may be transmitted in the UL data region. In the PDCCH, DCI (Downlink Control Information), for example, DL data scheduling information, UL data scheduling information, etc. may be transmitted. In the PUCCH, UCI, for example, ACK/NACK (Positive Acknowledgement/Negative Acknowledgement) information related to DL data, CSI (Channel State Information) information, SR (Scheduling Request), etc. may be transmitted. The GP provides a time gap in a process of switching a transmission mode to a reception mode or switching from a reception mode to a transmission mode in a base station (BS) and a UE. Some symbols at a point in time when DL is switched to UL within the subframe may be set as a GP.

Overview of FDR System and Interference Element in FDR

The FDR system enables simultaneous transmission and reception of uplink and downlink signals on the same frequency band. Accordingly, the FDR system may increase spectral efficiency up to two times that of the existing system for transmitting and receiving uplink and downlink signals by dividing a frequency or time and thus is being spotlighted as one of the core technologies of a next-generation mobile communication system.

From the viewpoint of any wireless device, an FDR technology using a single frequency transmission band may be defined as a transmission resource configuration method of simultaneously performing transmission and reception through a single frequency transmission band. As a special example thereof, the FDR technology may be represented as a transmission resource configuration method of simultaneously performing, for wireless communication between a general access node (e.g., a base station, a repeater, a relay node, a remote radio head (RRH), etc.) and a wireless terminal, downlink transmission and uplink reception of the base station and downlink reception and uplink transmission of the wireless UE through a single frequency transmission band. As another example, the FDR technology may be represented as a transmission resource configuration method of simultaneously performing transmission and reception between wireless UEs in the same frequency transmission band in a situation of device-to-device direct communication (D2D) between wireless UEs.

Hereinafter, although the present disclosure describes proposed technologies related to FDR such as wireless transmission and reception between a general base station and a wireless UE, various proposed embodiments are applicable to a network wireless device for performing wireless transmission and reception with a UE other than a general base station and direct UE-to-UE communication between UEs.

Figure 4:
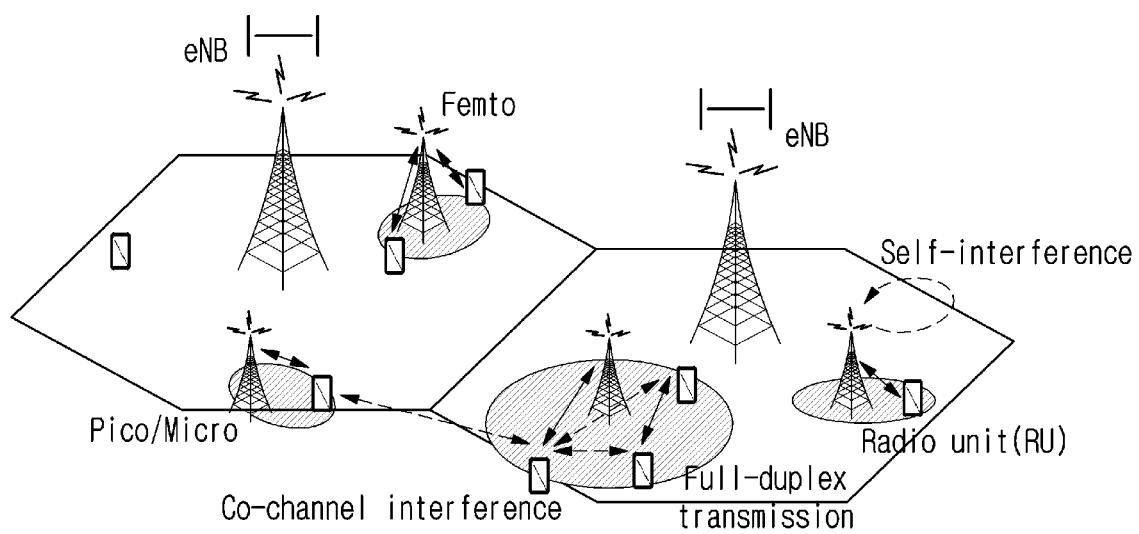
FIG. 4 illustrates the concept of a user equipment (UE) and a base station supporting full duplex radio (FDR) according to an embodiment of the present disclosure.

FIG. 4 illustrates the concept of a user equipment (UE) and a base station supporting full duplex radio (FDR) according to an embodiment of the present disclosure. In the FDR situation shown in FIG. 4, there may be a total of three types of interference as follows.

Intra-device self-interference: Since transmission and reception are performed using the same time and frequency resources, a device simultaneously receives not only a desired signal but also a signal transmitted by the device. In this case, the signal transmitted by the device is received by a receive antenna of the device with little attenuation and thus is received with much greater power than the desired signal, thereby acting as interference.

UE to UE inter-link interference: This means that an uplink signal transmitted by a UE is received by an adjacent UE, thereby acting as interference.

BS to BS inter-link interference: This means that a signal transmitted between BSs or heterogenous base stations (e.g., a picocell, a femtocell or a relay node) in a HetNet situation is received by a receive antenna of another base station, thereby acting as interference.

Among the above three types of interference, intra-device self-interference (SI) occurs only in the FDR system. The SI greatly degrades performance of the FDR system, which is treated as a first problem to be solved in order to operate the FDR system.

Figure 5:
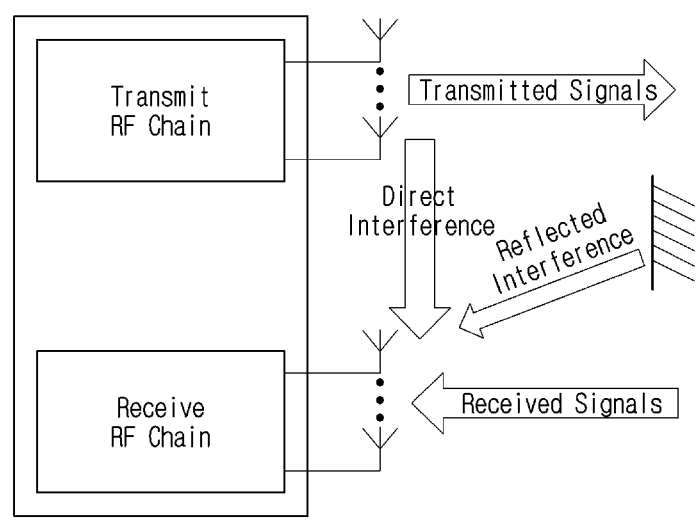
FIG. 5 illustrates an example of transmit/receive link and self-interference in an FDR communication situation according to an embodiment of the present disclosure.

FIG. 5 illustrates an example of transmit/receive link and self-interference in a FDR communication situation according to an embodiment of the present disclosure.

As shown in FIG. 5, SI may be classified into direct interference in which a signal transmitted by a transmit antenna directly enters a receive antenna without path attenuation and reflected interference reflected by a surrounding terrain. The intensity of the direct interference and the reflected interference is generally greater than that of the desired signal because of a difference in physical distance. Due to such a large intensity of interference, effective cancellation of SI is essential for operating the FDR system.

In order to efficiently operate the FDR system, requirements of self-interference cancellation (self-IC) according to maximum transmit power may be determined as shown in Table 1 below.

TABLE 1

| Node Type | Max. Tx Power ($P_A$) | Thermal Noise (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

According to the bandwidth of a mobile communication system, a thermal noise value may be determined by $N_{0,BW} = -174$ dBm+10×$\log_{10}$(BW), and Table 1 shows thermal noise on the assumption of bandwidth of 20 MHz. A receiver noise figure (NF) is an example of considering the worst case of the 3GPP standard requirements. A receiver thermal noise level may be determined by a sum of thermal noise in specific BW and receiver NF.

Referring to Table 1, it can be seen that self-interference cancellation performance of 119 dBm is required in order for a UE to efficiently drive the FDR system in bandwidth of 20 MHz. In order to obtain such self-interference cancellation performance, there are a total of three steps of self-interference cancellation techniques, which will be described below in detail.

antenna self-IC: This is a technique to be preferentially executed among all self-interference cancellation techniques, and SI cancellation is performed at an antenna end. As a simplest way, a material capable of blocking signals between transmit and receive antennas may be installed to physically block transmission of an SI signal, a distance between antennas may be intendedly controlled using multiple antennas or the phase of a specific transmitted signal may be inverted to cancel some SI signals. In addition, some SI signals may be canceled using a multi-polarized antenna or a directional antenna.

analog self-IC: This is a technique that cancels interference at an analog end before a received signal passes through an analog-to-digital converter (ADC) and cancels SI signals using a duplicated analog signal. This may be performed in an RF domain or an IF domain. A method of cancelling an SI signal will be described below in detail. A transmitted analog signal is delayed in time and then a duplicated signal of the actually received SI signal may be generated by adjusting a magnitude and a phase thereof, and subtracted from a signal received by a receive antenna. However, since processing is performed using the analog signal, additional distortion may occur due to implementation complexity and circuit characteristics, thereby greatly changing interference cancellation performance.

digital self-IC: This is a technique that cancels interference after a received signal passes through an ADC and includes all interference cancellation techniques performed in a baseband domain. As a simplest way, a duplicated signal of SI may be generated using a transmitted digital signal and subtracted from a received digital signal. Alternatively, techniques for preventing a signal transmitted by a UE or a base station from being received by a receive antenna by performing precoding/postcoding in the baseband using multiple antennas may also be classified as digital self-interference cancellation.

However, since digital self-interference cancellation is feasible when a digitally modulated signal is quantized enough to restore information on a desired signal, there is a need for a precondition that a difference in signal power level between an interference signal remaining after cancelling interference using one or more of the above-described techniques and the desired signals is within an ADC range.

Figure 6:
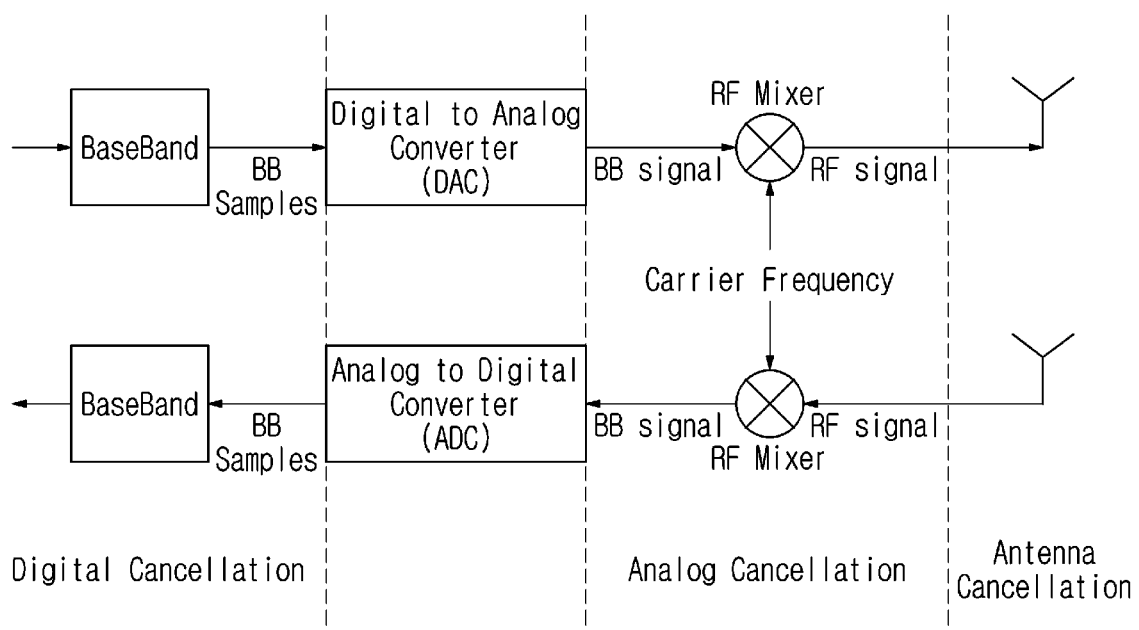
FIG. 6 illustrates a position, to which three interference techniques at a radio frequency (RF) front end is applied, according to an embodiment of the present disclosure.

Positions, to which the above-described three self-interference cancellation techniques are applied, are shown in FIG. 6. FIG. 6 illustrates positions, to which three interference techniques at a radio frequency (RF) front end is applied, according to an embodiment of the present disclosure. Referring to FIG. 6, antenna cancellation for performing antenna self-interference cancellation is applied to an antenna section, analog cancellation for performing analog self-interference cancellation is applied to a section including a mixer for converting a baseband signal into an RF signal, and digital cancellation for performing digital self-interference cancellation is applied to a section before digital-to-analog converter (DAC) input and after ADC output.

Figure 7:
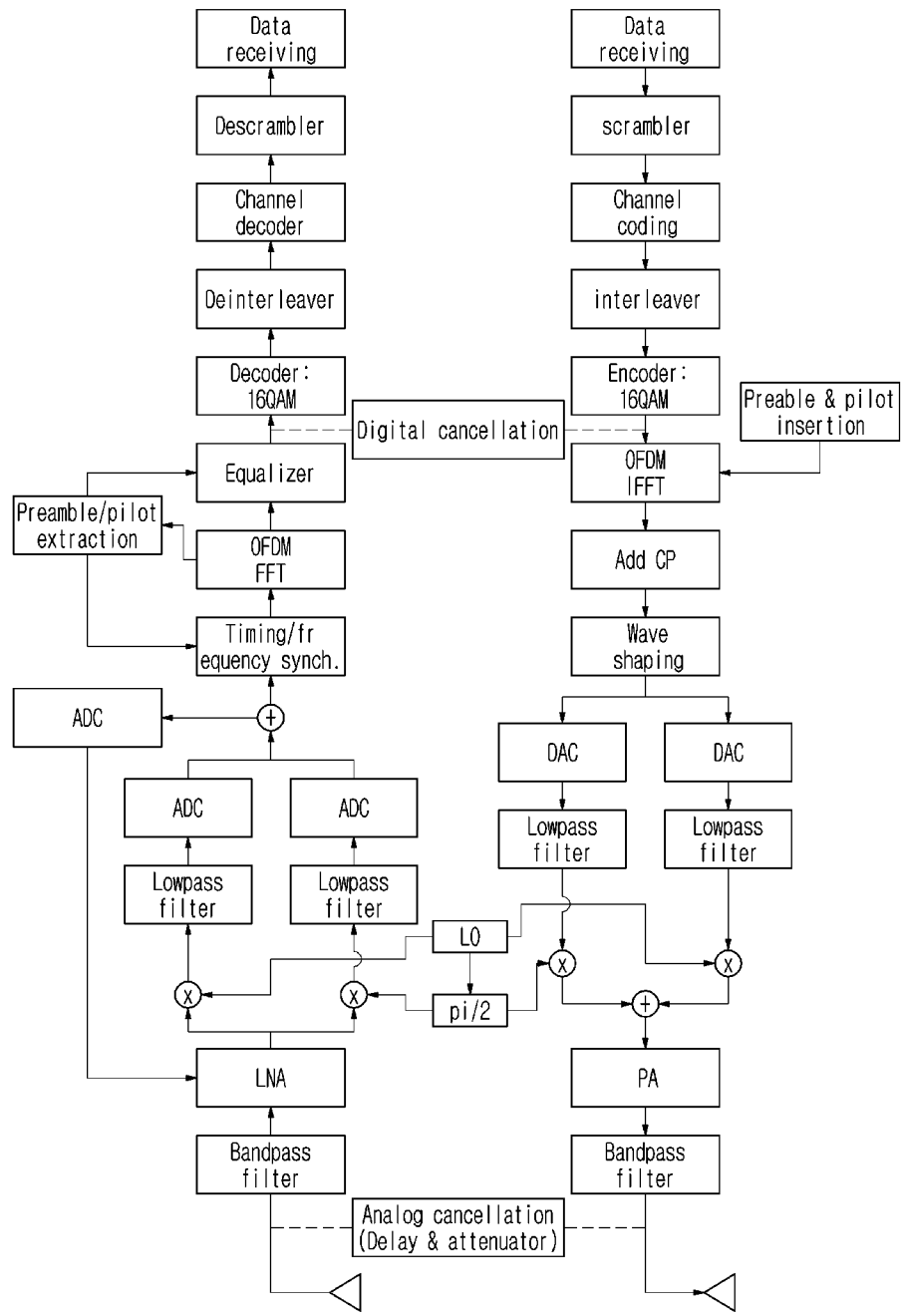
FIG. 7 illustrates the structure of a transceiver for self-interference cancellation in a communication device according to an embodiment of the present disclosure.

FIG. 7 illustrates the structure of a transceiver for self-interference cancellation in a communication device according to an embodiment of the present disclosure. In FIG. 7, a digital cancellation block for performing digital self-interference cancellation performs interference cancellation using digital self-interference signal (digital SI) before the DAC and after passing through the ADC. However, in another example, digital self-interference cancellation may be performed using a digital self-interference signal after passing through an IFFT and before passing through an FFT. In addition, although FIG. 7 shows a structure for canceling a self-interference signal by separating a transmit antenna and a receiver antenna, an antenna interference cancellation technique using one antenna may be used in another example. In this case, the antenna structure may be different from the example of FIG. 7. To this end, a function block suitable for a purpose may be further added or deleted.

Signal Modeling of FDR System

The FDR system uses the same frequency between the transmitted signal and the received signal and thus are greatly affected by non-linear components in RF. In particular, the transmitted signal may be distorted by the non-linear characteristics of active elements such as the power amplifier of a transmit RF chain and a low noise amplifier (LNA) of a receive RF chain, and distortion may also be caused by a mixer in the transmit and receive RF chains. Due to such distortion, the transmitted signal may be modeled as generating a high-order component. Among them, an even-order component is generated around direct current (DC) and in a high frequency region corresponding to several times a center frequency and thus may be efficiently removed using an existing alternative current (AC) coupling or filtering technique. However, an odd-order component is generated adjacent to an existing center frequency and is not easily removed, unlike the even-order component, thereby having great influence upon reception. In consideration of the non-linear characteristics of the odd-order component, the received signal after the ADC in the FDR system is expressed using a parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, y(n) denotes a received signal, $h_D(n)$ denotes a channel experienced by desired data, $x_D(n)$ denotes desired data to be received, $h_{SI,k}(n)$ denotes a self-channel experienced by transmitted data, $x_{SI}(n)$ denotes transmitted data, and z(n) denotes additive white gaussian noise (AWGN). $h_{SI,k}(n)$ is a linear component when k is 1 and is a non-linear component when k is an odd number of 3 or more.

In order to cancel the above-described analog or digital self-interference, it is necessary to estimate a self-channel. In this case, a received signal after performing self-interference cancellation using gain of the estimated analog or digital self-channel may be expressed as shown in Equation 2 below.

$$y_{Self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n)}_{\text{Residual SI}} + z(n),$$ [Equation 2]

In Equation 2, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Thereafter, a result of decoding the received signal using the gain of the estimated desired channel is shown in Equation 3 below.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2}$$ [Equation 3]

$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

$$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)$$

$$e(n) = h_D(n) - \hat{h}_D(n)$$

In Equation 3, $\hat{h}_D(n)$ denotes an estimated desired channel, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Figure 8:
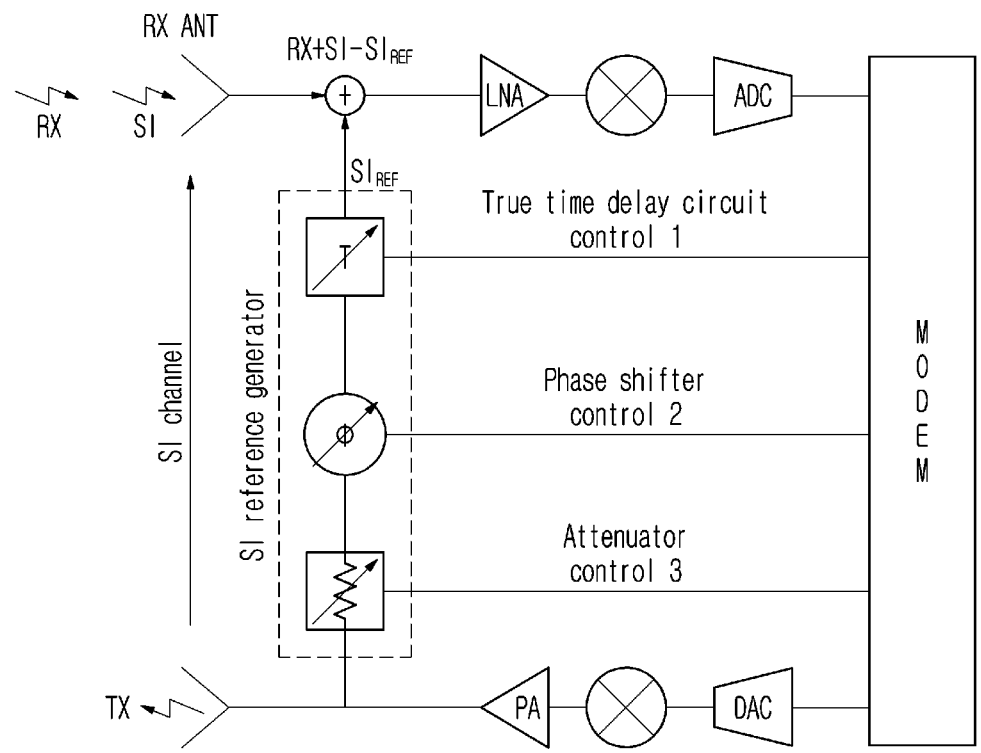
FIG. 8 illustrates an example of an RF chain of a communication device for self-interference signal cancellation according to an embodiment of the present disclosure.

FIG. 8. illustrates an example of an RF chain of a communication device for self-interference signal cancellation according to an embodiment of the present disclosure.

In order to cancel a self-interference signal in a communication device using an FDR method, a duplicated signal equal to the self-interference signal (hereinafter referred to as a "self-interference reference signal") is necessary. Referring to FIG. 8, in order to cancel the self-interference signal, a method of subtracting a self-interference reference signal $SI_{REF}$ from a self-interference signal before the LNA of a receive chain is generally used. In this case, in order to generate the self-interference reference signal $SI_{REF}$ in the communication device, a transmitted signal of a transmission end is branched. In the example of FIG. 8, a TX signal is branched after passing through a PA in the transmission end. A portion of the branched transmitted signal passes through an SI reference generator including an attenuator, a phase shifter and a time delay circuit. A self-interference reference generator mimics a self-interference channel and generates a self-interference reference signal $SI_{REF}$ from the branched transmitted signal. In this case, a channel experienced by the self-interference signal is separately estimated such that the self-interference reference generator mimics the self-interference channel.

First, the communication device may generate a control signal for the time delay circuit, a control signal for the phase shifter and a control signal for the attenuator, after estimating the self-interference channel. In this case, a desired RX signal should not be input to a self-interference reference signal path.

There are two methods for controlling the self-interference reference generator by the communication device. As a first method, the communication device may stop communication and transmit a signal for estimating a self-interference channel (e.g., a pilot signal or a reference signal) in an allocated communication band or channel band in order to separately estimate a channel, into which a self-interference signal is introduced, and the self-interference reference generator may mimic a self-interference signal based on information on the signal for estimating the self-interference channel during communication. As a second method, the communication device may transmit a signal for estimating a self-interference signal channel (e.g., a reference signal, a pilot signal or a tone) at both ends of a communication channel band (e.g., guard bands) and control the self-interference reference generator to reduce the signal for estimating the self-interference signal channel according to an adaptive feedback algorithm.

In the first method, in order to find the optimized state of the self-interference reference generator, it is first necessary to estimate the self-interference channel. To this end, a transmission device and a reception device should stop communication. Moreover, even if complete self-interference channel is performed, very accurate calibration of a self-interference reference path is required. The channel of the self-interference reference path is preferably represented by a look-up table based on a combination of all control voltages. Even if an accurate look-up table is created at a specific transmit power and temperature, this is changed according to the original Tx power and the temperature of the circuit. Therefore, self-interference signal cancellation performance may deteriorate due to calibration measurement errors and a difference between current transmit power and temperature and conditions when the look-up table is created. In addition, the first method cannot follow the self-interference signal channel varying over time.

In the second method, since the communication device transmits the signal for estimating the self-interference signal channel (e.g., a tone, a pilot signal, a reference signal, etc.) at both sides of the communication band, communication may not be stopped. In addition, in the second method, since the self-interference reference generator is controlled using an adaptive feedback algorithm in a time-continuous manner, calibration of the self-interference reference generator is unnecessary. However, since the self-interference reference generator is controlled using guard bands at the both sides of the communication band instead of the communication band, a self-interference signal may not be canceled due to transmission of a tone inside the most important communication band.

Figure 9:
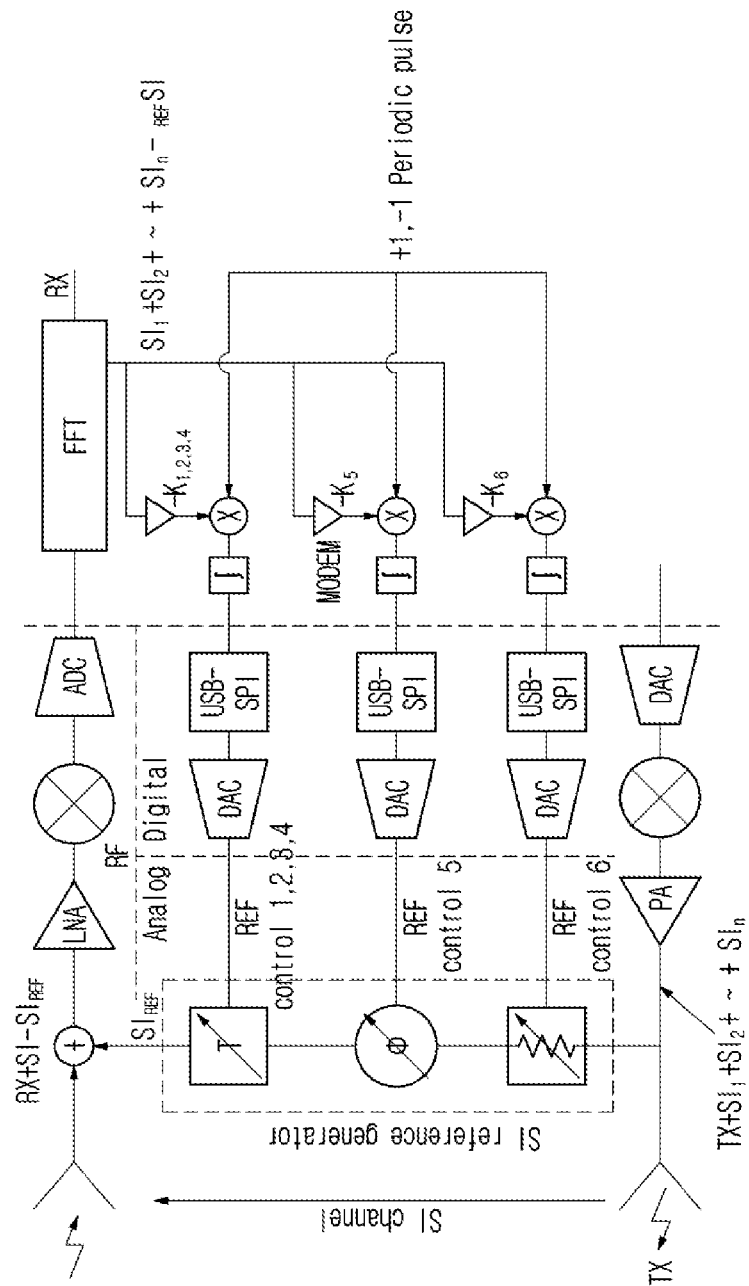
FIG. 9 illustrates another example of an RF chain of a communication device for self-interference signal cancellation according to another embodiment of the present disclosure.

FIG. 9 illustrates another example of an RF chain of a communication device for self-interference signal cancellation according to another embodiment of the present disclosure.

Referring to FIG. 9, the RF chain of the communication device may include a communication modem, a self-interference reference generator, a Tx antenna, an Rx antenna, etc. The communication modem may include a fast Fourier transform (FFT) block and integrators. The self-interference reference generator may include an attenuator, a phase shifter and a time delay circuit.

The self-interference reference generator may control the attenuator, the phase shifter and the time delay circuit in an analog manner in order to generate or duplicate a precise self-interference reference signal. To this end, the RF chain may include at least one DAC for converting a control signal transmitted from a communication mode into an analog signal.

Based on the concept of the time delay circuit basically defined as phase shift versus the slope of a frequency band, it is impossible to control time delay with only information at one a single frequency. Accordingly, in order to perform self-interference signal cancellation in a wide band, information at a least two frequencies is required, such that two or more pilot signals, two or more reference signals or two or more tones may be transmitted as test signals.

In order to control the self-interference reference generator, multi-reference signals, multi-tones or multi-pilot signals may be used as test signals. First, in FIG. 9, the communication modem may monitor a power sum of multi-tones at a frequency at which the multi-tones as the test signals are located and measure power of each multi-tone at a frequency location where the multi-tones are transmitted, thereby calculating a sum of powers. Here, power measured at the frequency location of the transmitted tone corresponds to the power of the self-interference signal.

The communication modem may transmit a control signal such that a difference between a power sum of self-interference signals due to the multi-tones and the power of the self-interference reference signal is minimized. That is, the communication modem may feed the control signal back to the self-interference reference generator such that the sum of the powers of the self-interference signals due to the multi-tones is minimized. The self-interference reference generator generates a self-interference reference signal according to the fed-back control signal. In order to remove the measured power sum of the self-interference signals, the communication modem may generate a self-interference reference signal with power closest to the power sum.

The communication modem may control the self-interference reference generator until the power sum $SI=SI_1+SI_2+SI_3+ \ldots +SI_n$ of the self-interference signals is minimized using an adaptive feedback loop. Here, $SI_n$ is power of the self-interference signal measured at a frequency location where an n-th reference signal of a plurality of reference signals is transmitted. The communication modem uses a periodic pulse signal of +1 and −1 such that the sign of the increment of a bias voltage controlled by the loop function of adaptive feedback is changed. Here, the loop function means a function for searching around a current variable in the feedback loop including a variable to be controlled.

The communication modem may feed the control signal back to the phase shifter, the attenuator and the time delay circuit using the adaptive feedback loop, such that the self-interference reference generator generates a self-interference reference signal with power closest to the power sum of the self-interference signals.

The method of controlling generation of the self-interference reference signal described with reference to FIG. 9 has an advantage that complicated channel estimation and calibration are unnecessary because the adaptive feedback algorithm operates with only the power sum of the multi-tones.

Figure 10:
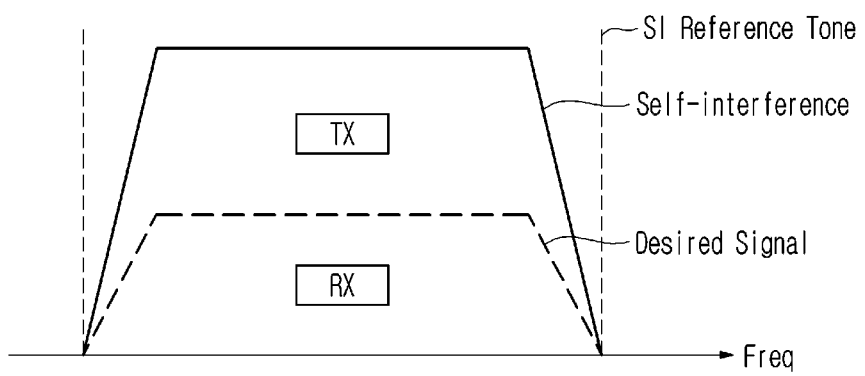
FIG. 10 illustrates examples of two tones used to generate a self-interference reference signal according to an embodiment of the present disclosure.

FIG. 10 illustrates examples of two tones used to generate a self-interference reference signal according to an embodiment of the present disclosure. FIG. 10 shows two tones transmitted at both sides (e.g., guard bands) of the communication band in order to control the self-interference reference generator of FIG. 8 or 9.

Referring to FIG. 10, tones for estimating the self-interference signal channel may be transmitted at the guard bands located at both ends of the communication channel band and the self-interference reference generator may be controlled to reduce tones according to the adaptive feedback algorithm. In this case, a desired signal, from which self-interference is canceled, may be stably received.

Figure 11:
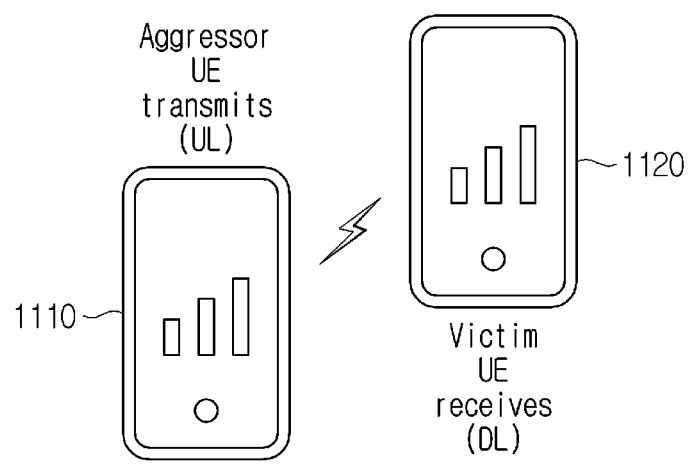
FIG. 11 illustrates an example of CLI between an uplink and a downlink according to an embodiment of the present disclosure.

FIG. 11 illustrates an example of CLI between an uplink and a downlink according to an embodiment of the present invention.

In addition, as an example, referring to FIG. 11, cross link interference (CLI) may be considered as interference between links. As a concrete example, in a new communication system (e.g., NR), a resource may be allocated based on a dynamic time division duplex (TDD) method by considering efficiency of resource usage. Herein, CLI between an uplink and a downlink may occur. Specifically, referring to FIG. 11, it is possible to consider a terminal (aggressor UE) 1110 performing uplink transmission in a specific cell and a terminal (victim UE) 1120 receiving a downlink in another cell. Herein, an uplink signal of the terminal 1110 performing the uplink transmission may become interference to the terminal 1120 receiving the downlink, and the above-described CLI may occur. As another example, based on the above-described situation, CLI may also occur between base stations or between a base station and a terminal.

Based on the above description, a method may be required for a terminal to measure, report and reduce CLI between terminals. In this case, as an example, in order to measure CLI, the terminal may measure at least any one of CLI received signal strength indicator (CLI-RSSI) and sounding reference signal-received signal received power (SRS-RSRP). The terminal may report at least any one of CLI-RSSI and SRS-RSRP, which are measured based on a RRC message, to a base station periodically or based on event triggering. Based on information thus reported, the base station may operate a resource so as to minimize interference and thus may operate the resource efficiently.

Hereinafter a method for minimizing interference between terminals by considering the above-described CLI operation will be described. As an example, although CLI described above was mainly between a terminal performing uplink transmission and a terminal performing downlink reception based on dynamic TDD but may not be limited thereto. As an example, it is possible to consider a case where a base station performs downlink transmission and uplink reception at the same time based on an FDR mode. In this case, a specific corresponding terminal may perform uplink transmission, another terminal may perform downlink reception, and CLI may occur. That is, CLI may occur based on various transmission types, and hereinafter a method for minimizing interference will be described based on CLI.

Detailed Embodiments of the Present Invention

An FDR communication system is a communication system that receives and transmits data at a same frequency band. The FDR communication system may improve the frequency use efficiency as much as twice that of the existing frequency-division duplex (FDD)/time-division duplex (TDD) scheme in a half-duplex mode. However, as a base station/terminal in the FDR communication system transmits and receives a signal simultaneously at a same frequency band and thus a transmission signal may interfere with a reception unit, a method for minimizing such an interference effect is needed. Interference signals like cross-link interference (CLI), which is generated by transmission and reception signals of a neighboring communication devices, and self-interference (SI), by which a transmission signal of a communication device becomes interference to a reception unit of the communication device, may degrade the receiving performance of receivers. Accordingly, in an FDR communication system, a terminal may prevent SI, that is, interference of its transmission signal on a receiving end of a communication apparatus by selecting or adjusting a beam pattern. Herein, in case the terminal selects or adjusts a beam without considering another terminal, a transmission beam of the terminal becomes CLI of the another terminal, so that communication performance of the terminal may be reduced.

While a base station and a terminal perform communication, terminals within a cell may be distinguished into an aggressor terminal and a victim terminal according to whether they have or are subject to an interference effect. An aggressor terminal is a terminal having an interference effect on another terminal, while a victim terminal is a terminal subject to an interference effect of another terminal. Depending on situations, each terminal may become an aggressor terminal or a victim terminal and become both of them in some cases. Accordingly, when a terminal determines a beam pattern, situations of other terminals should be considered. SI information and CLI information on many candidate beams are necessary for a terminal to select or adjust a beam so that SI may be prevented and CLI of other terminals may not increase. However, in case a large number of terminals are so close to have CLI effects on each other or in the case of a signal in an mmWave band that is designed to be populated with beams, a lot of time may be required to measure SI and CLI for each beam, and thus it may be difficult to optimize communication performance while reducing effects of interference.

Accordingly, the present disclosure proposes a beam selection method that optimizes communication performance by selecting a beam pattern minimizing interference effects of SI and CLI in an FDR communication system.

According to the present disclosure, as sensor information of terminals is used to minimize interference between terminals due to a transmission beam of a terminal, communication performance of terminals may be prevented from being degraded in a full-duplex situation, and communication performance of terminals may even be improved. Hereinafter, a method for selecting, by a terminal, a beam pattern minimizing interference effects of SI and CLI will be described in detail.

At a first step, the terminal may transmit its sensor information to a base station based on a request of the base station for information necessary for beam pattern determination. The sensor information may include GPS location information of the terminal and azimuth information generated by a gyroscope. Herein, the terminal may be a single terminal within one group and may be a plurality of terminals. The group may be a single cell, a set of particular terminals within one cell, or a set of terminals included in a plurality of cells and is not limited to a specific type.

As an example, terminals in one group may transmit, to a base station, sensor information including GPS location information of each terminal and azimuth information generated by a gyroscope. Herein, when knowing information on a beam pattern with a small SI effect among transmission beam patterns that may be transmitted, each terminal may transmit, to the base station, the information on the beam pattern with a small SI effect together with the sensor information. As an example, the information on the beam pattern with a small SI effect may include information on top N transmission beams determined in an ascending order of interference effects and/or information on bottom N transmission beams determined in a descending order of effective interference caused by measured residual SI, among beam indexes with residual SI values that do not exceed a predetermined threshold. That is, the base station may request sensor information and beam pattern information, which satisfies residual SI at a permitted level or below, to each terminal, and a terminal may transmit those pieces of information to the base station according to the request.

At a second step, based on the information necessary for beam pattern determination received from the terminal, the base station may transmit candidate beam pattern information to a terminal (hereinafter 'aggressor terminal') that performs uplink transmission. As an example, based on sensor information including arrangement information and azimuth information of each terminal, the base station may determine a candidate beam pattern, which is determined to have a small interference effect, and transmit information on the candidate beam pattern to an aggressor terminal. As an example, after receiving, from a terminal, information on a beam pattern with an SI effect together with sensor information, the base station may transmit, to an aggressor terminal, information on a candidate beam pattern that is determined to have a small interference effect by considering sensor information, among beam patterns with small SI effects.

At a third step, the aggressor terminal may sequentially transmit a candidate beam pattern based on the information on the candidate beam pattern received from the base station. In addition, the aggressor terminal may measure residual SI for the candidate beam pattern that the aggressor terminal transmits. Herein, a terminal receiving a downlink (hereinafter 'victim terminal') may measure CLI for each candidate beam pattern that the aggressor terminal transmits. The aggressor terminal and the victim terminal may residual SI measurement information and CLI measurement information for each candidate beam pattern to the base station.

At a fourth step, the base station may determine a beam pattern of each aggressor terminal reducing an interference effect based on a residual SI measurement value and a CLI measurement value for each candidate beam pattern, which terminals measure. As an example, the base station may determine a beam pattern with CLI lower than a threshold among candidate beam patterns and transmit information on the beam pattern to the aggressor terminal. As an example, the base station may determine a beam pattern with residual SI lower than a threshold among candidate beam patterns and transmit information on the beam pattern to the aggressor terminal.

At a first step, a base station may transmit a CLI measurement request signal to terminals in a cell. When receiving the CLI measurement request signal, the terminals may transmit their own sensor information to the base station. Accordingly, the base station may receive, from the terminals, the sensor information that includes the GPS information and gyroscope azimuth information of each of the terminals. Next, based on the sensor information received from the terminals, the base station may determine a candidate beam pattern for each of aggressor terminals.

As an example, the base station may monitor a three-dimensional distribution of each terminal by using the location information and height information of each terminal. Based on 3-axis (x-axis, y-axis and z-axis) azimuth information of each terminal, the base station may monitor arrangement information of current terminals and a direction of a beam of each of the terminals. Herein, in case a specific beam of a specific terminal is directed toward another terminal, the specific beam may increase CLI of the another terminal, so that the base station may directly exclude beam patterns directed to the another terminal from candidate beam patterns.

In addition, as an example, in case the base station needs not consider such items as a reflected wave of beam and a side lobe, the base station may directly determine a transmission beam pattern suitable for each terminal by using the position, height and 3-axis azimuth information of the each terminal and may transmit information on the transmission beam pattern thus determined to the each terminal. That is, in this case, a beam pattern may be determined only based on sensor information and residual SI information that the base station receives from a terminal. Accordingly, the step described below may be skipped in which an aggressor terminal transmits sequentially candidate beam patterns and a beam pattern is determined based on a residual SI result and a CLI result measured for the candidate beam patterns.

As another example, sensor information that a base station receives from a terminal may be beam measurement information. As a concrete example, the terminal may perform measurement for a plurality of transmission beams from the base station and, based on this, may perform beam measurement report. Based on the beam measurement report, the base station may select a transmission beam. As an example, the base station may transmit a plurality of beams to the terminal based on any one of CSI-RS and SSB, and the terminal may perform beam measurement and transmit a beam measurement report to the base station.

Herein, as an example, the terminal may transmit beam measurement information instead of the above-described sensor information to the base station, and the base station may determine a transmission beam pattern by using beam measurement report information and may transmit information on the transmission beam pattern to the terminal. As yet another example, the terminal may transmit both the beam measurement report information and the sensor information to the base station, and the base station may determine a transmission beam pattern by using the beam measurement report information, which may not be limited to the above-described embodiment. As an example, for convenience of explanation, the description below focuses on sensor information but is not limited thereto, and the above-described beam measurement report information is applicable likewise.

Figure 12:
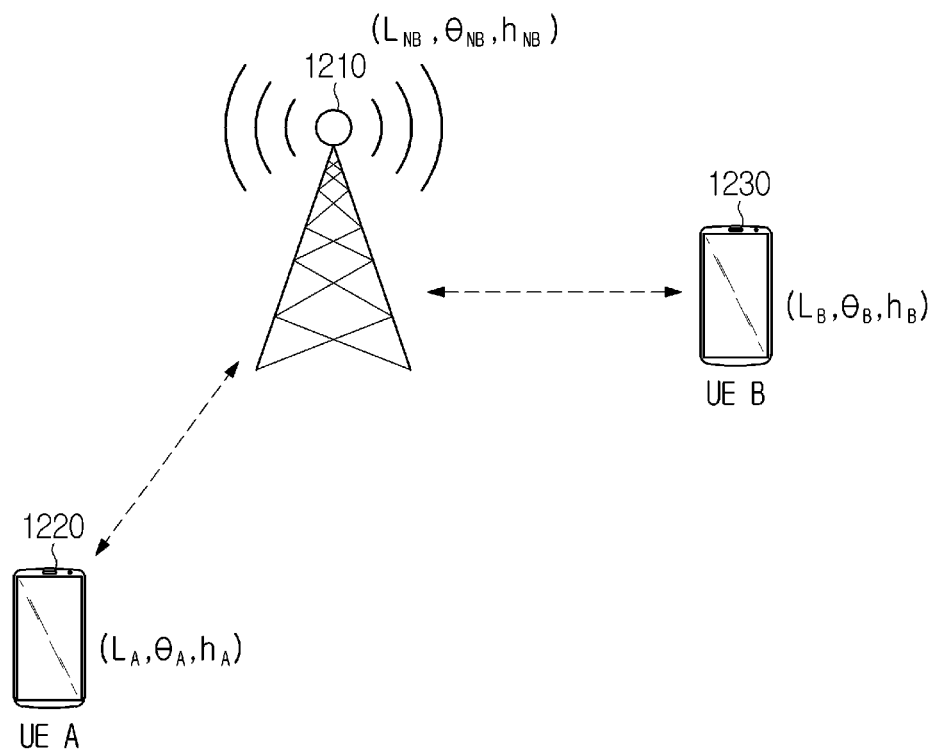
FIG. 12 illustrates an example of calculating, by a base station, the location and direction of a beam transmitted by a terminal base on sensor information received from a terminal, according to an embodiment of the present disclosure.

FIG. 12 illustrates an example of calculating, by a base station, the location and direction of a beam transmitted by a terminal base on sensor information received from a terminal, according to an embodiment of the present disclosure.

Referring to FIG. 12, the GPS coordinates of a terminal A 1220 and a terminal B 1230 may be expressed as $(L_A, Q_A)$ and $(L_B, Q_B)$ respectively, and the heights may be expressed as $h_A$ and $h_B$ respectively. Sensor information may include at least one of GPS location information of a terminal and gyroscope azimuth information. As an example, a base station 1210 may receive location information of the terminal A 1220 and location information of the terminal B 1230 using GPS from the terminal A 1220 and the terminal B 1230. The base station 1210 may identify a beam pattern having an effect on the terminal B 1230 among transmission beam patterns of the terminal A 1220 based on the location information of the terminal 1220 and the location information of the terminal B 1230. As an example, as a ground surface within a cell including the base station 1210 may be assumed to be relatively close to a plane, an angle β of a beam directed from the terminal A 1220 to the terminal B 1230 based on north N may be calculated by Equation 4 below.

$$\beta = \mathrm{atan}\left(\frac{Y}{X}\right) \qquad \text{[Equation 4]}$$

$$X = \cos\theta_B * \sin(L_A - L_B)$$

$$Y = \cos\theta_A * \sin\theta_B - \sin\theta_A * \cos\theta_B * \cos(L_A - L_B)$$

An angle φ from the terminal A 1220 to the terminal B 1230 according to latitude may be calculated by Equation 5 below.

$$\varphi = \mathrm{atan}\left(\frac{\Delta h}{dist}\right) \qquad \text{[Equation 5]}$$

$$\text{where } a = \sin^2\left(\frac{\Delta L}{2}\right) + \cos(L_A)\cos(L_B)\sin^2\left(\frac{\Delta \theta}{2}\right),$$

$$dist = 2 \cdot R \cdot \mathrm{atan}\left(\frac{\sqrt{a}}{\sqrt{1-a}}\right)$$

R: Average radius of earth (km)

That is, the base station may identify the direction and angle of a beam pattern, in which an aggressor terminal has a direct effect on a victim terminal, by using sensor information received from each terminal. Accordingly, when receiving sensor information of terminals within a same cell, the base station may identify a beam direction having a direct effect on other terminals according to a location of each terminal. In addition, the base station may predict a degree of interference effect based on uplink power of an aggressor terminal and a distance between the aggressor terminal and a victim terminal. That is, although the base station is not capable of accurately predicting an effect of a reflected wave, the base station may identify a beam direction of an aggressor terminal, which may have a direct interference effect, and exclude a beam pattern having a direct interference effect from candidate uplink beam patterns.

Figure 13:
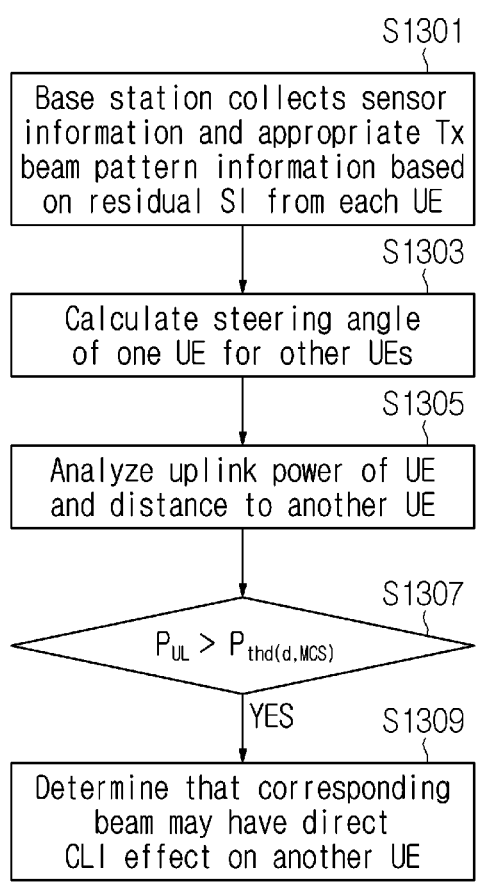
FIG. 13 illustrates an example of procedure for determining a beam pattern of a terminal having an interference effect based on sensor information that a base station receives from a terminal according to an embodiment of the present disclosure.

FIG. 13 illustrates an example of procedure for determining a beam pattern of a terminal having an interference effect based on sensor information that a base station receives from a terminal according to an embodiment of the present disclosure.

Referring to FIG. 13, at step S1301, a base station may receive sensor information and transmission beam pattern information with residual SI at a predetermined level or lower from each terminal. As an example, the base station may request information necessary for beam pattern determination to one or more terminals, and a terminal may transmit its sensor information and information on a transmission beam pattern, which already has residual SI at a predetermined level or lower, to the base station based on the information necessary for beam pattern determination.

At step S1303, the base station may calculate a steering angle of an aggressor terminal for victim terminals. As an example, based on sensor information received from a terminal and including GPS location information of the terminal and azimuth information generated by a gyroscope, the base station may calculate a steering angle between each terminal and other terminals, for every terminal in a cell.

At step S1305, the base station may analyze uplink power of an aggressor terminal and a distance between the aggressor terminal and victim terminals. As an example, based on sensor information received from each terminal, the base station may calculate a distance from each terminal to other terminals in a cell.

At step S1307, the base station may determine whether or not uplink power of an aggressor terminal is equal to or greater than a power threshold. As an example, for an aggressor terminal and a victim terminal aligned with a beam direction of the aggressor terminal, the base station may estimate a power threshold by checking a distance between terminals and a modulation and coding scheme (MCS) of a terminal. Then, the base station may determine whether or not uplink power of the aggressor terminal, of which the beam pattern effect is to be determined, is equal to or greater than a power threshold.

At step S1309, based on a result determined at step S1307, the base station may determine whether or not the beam pattern has a direct CLI effect on another terminal. When the uplink power is greater than the power threshold, a corresponding beam may have a direct CLI effect on another terminal. The base station may exclude the beam pattern having a direct CLI effect from candidate beam patterns.

The base station needs CLI measurement information for candidate beam patterns in order to determine a beam pattern minimizing an interference effect and to transmit a result thus determined to a terminal. Hereinafter, a process of obtaining, by the base station, CLI measurement information for candidate beam patterns will be described.

Figure 14:
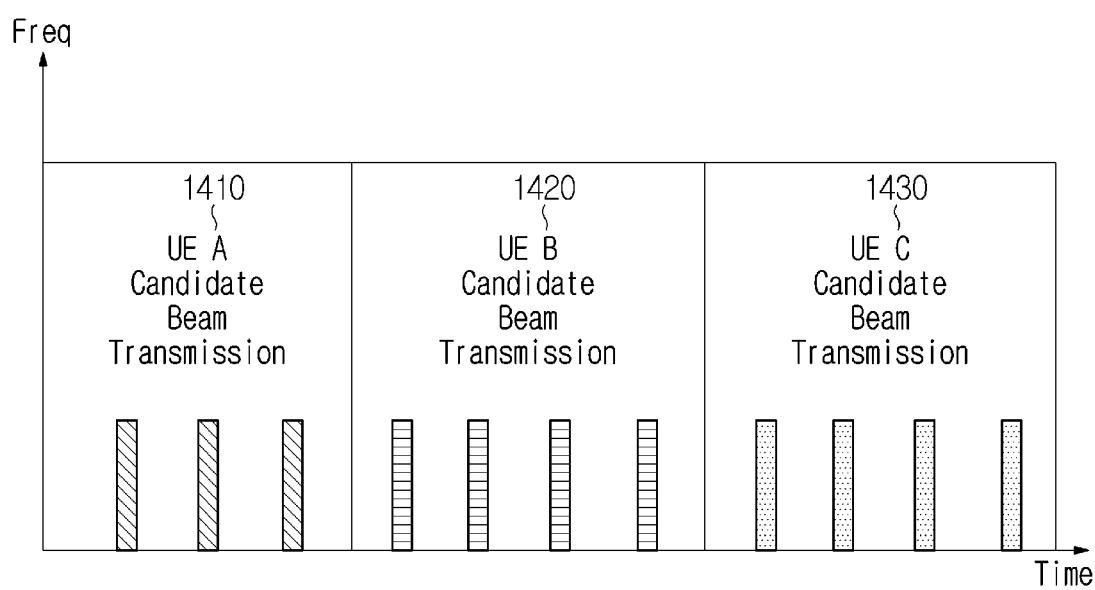
FIG. 14 illustrates an example of transmitting, by terminals, sequentially candidate beam patterns in order to measure CLI for a transmission beam of a terminal according to an embodiment of the present disclosure.

FIG. 14 illustrates an example of transmitting, by terminals, sequentially candidate beam patterns in order to measure CLI for a transmission beam of a terminal according to an embodiment of the present disclosure.

Referring FIG. 14, a terminal A 1410 transmits 3 candidate beam patterns, and a terminal B 1420 and a terminal C 1430 transmit 4 candidate beam patterns respectively. As an example, based on sensor information of a terminal, a base station may select a beam pattern with a small effect of residual SI as a candidate beam pattern. As an example, the base station may allocate a time for transmitting a signal to each terminal. Each of the terminals 1410, 1420 and 1430 may change a beam pattern and sequentially transmit the beam pattern during the allocated time based on information on each candidate beam pattern received from the base station. As the base station determines a number of candidate beam patterns transmitted by each terminal according to sensor information received from the each terminal, the number of candidate beam patterns may be different. Herein, victim terminals may perform CLI measurement for each beam pattern transmitted from each aggressor terminal.

Meanwhile, when the base station and a terminal communicate at such a high frequency as mmWave, a number of candidate beam patterns may increase due to an attenuation effect according to signal propagation. In this case, the base station may maintain an appropriate number of candidate beams by using sensor information (GPS location information and gyroscope azimuth information) received from the terminal and information on a transmission beam pattern that is suitable with respect to residual SI.

Figure 15:
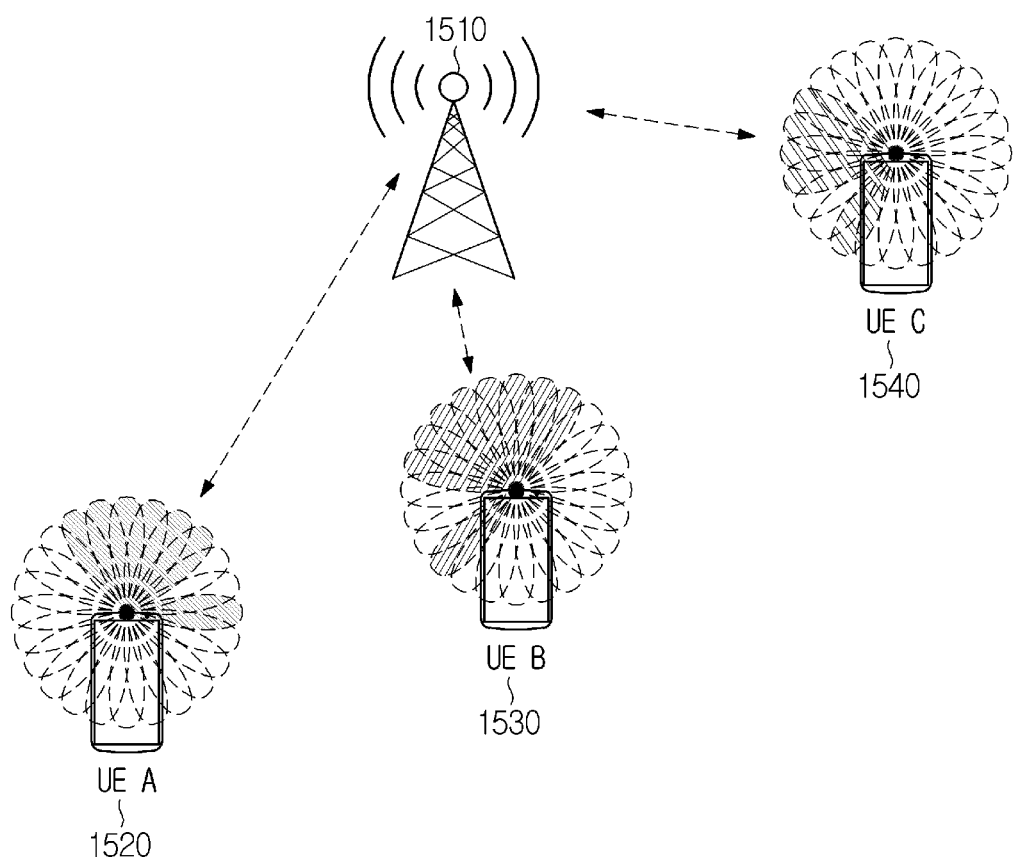
FIG. 15 illustrates an example of transmitting, by aggressor terminals, a candidate beam pattern according to an embodiment of the present disclosure.

FIG. 15 illustrates an example of transmitting, by aggressor terminals, a candidate beam pattern according to an embodiment of the present disclosure.

Referring to FIG. 15, a terminal A 1520, a terminal B 1530 and a terminal C 1540 may sequentially transmit a candidate beam pattern. A base station 1510 determines a candidate beam pattern based on sensor information transmitted by the terminals 1520, 1530 and 1540 and notifies the terminals 1520, 1530 and 1540. When the terminals 1520, 1530 and 1540 transmit a candidate beam according to the candidate beam pattern, other terminals 1520, 1530 and 1540 may measure CLI for the transmitted beam and transmit measurement information to the base station 1510. Based on CLI measurement information received from each terminal 1520, 1530 and 1540, the base station 1510 may determine a beam pattern with a smallest interference effect. The base station 1510 may transmit information on the determined beam pattern to each terminal 1520, 1530 and 1540.

Figure 16:
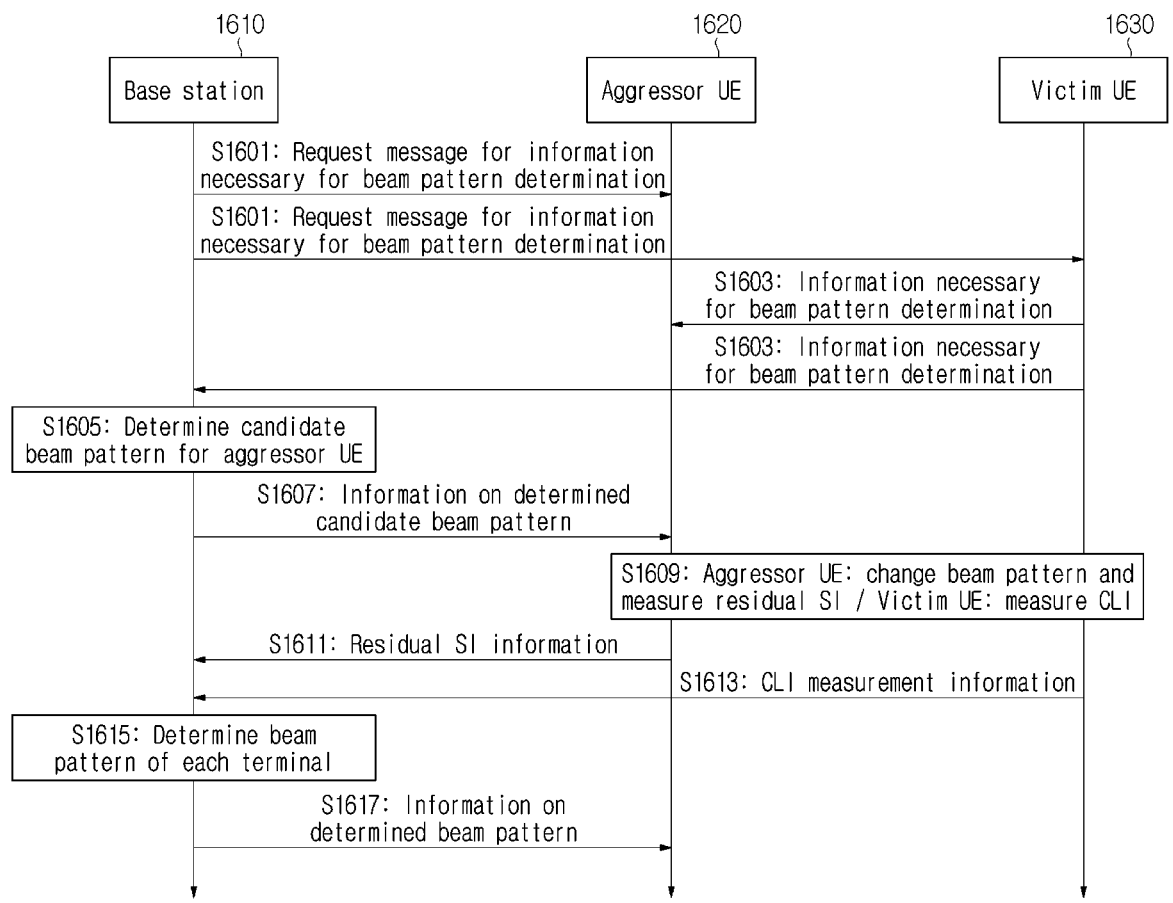
FIG. 16 illustrates an example of signal exchange between a base station and a terminal in order to determine a beam pattern minimizing interference effects according to an embodiment of the present disclosure.

FIG. 16 illustrates an example of signal exchange between a base station and a terminal in order to determine a beam pattern minimizing interference effects according to an embodiment of the present disclosure.

Referring to FIG. 16, at step S1601, a base station may request information necessary for beam pattern determination to a terminal. As an example, the base station may transmit, to the terminal, a message for requesting information necessary for determining an optimal beam pattern with a small interference effect among beam patterns that the terminal is capable of transmitting. Herein, the terminal may include both an aggressor terminal and a victim terminal. As an example, the base station may transmit, to each terminal in a group, a CLI measurement start flag, a sensor information request signal, and a Tx beam candidate index (SI) request signal. The group may be a single cell, a set of particular terminals within one cell, or a set of terminals included in a plurality of cells and is not limited to a specific type. Table 2 below illustrates attributes for the CLI measurement start flag, the sensor information request and the Tx beam candidate index request.

TABLE 2

| IE | Value |
| --- | --- |
| CLI measurement Start | True or False |
| Sensor Information Request | True or False |
| Candidate Tx Beam Index(SI) Request | True or False |

At step S1603, a terminal may transmit information necessary for beam pattern determination to the base station based on the request of the base station for the information necessary for beam pattern determination. As an example, the information necessary for beam pattern determination may include measured sensor information, a time stamp of the measured sensor information, and candidate beam pattern information that the terminal determines based on a residual SI value. Accordingly, when receiving a CLI measurement start flag, a sensor information request and a transmission and candidate index request, the terminal may transmit the information necessary for beam pattern determination to the base station. Table 3 below illustrates pieces of information necessary to determine a beam pattern.

TABLE 3

| IE | Value |
| --- | --- |
| Candidate Tx Beam Index(SI) | 1024 bit |
| Sensor Information | {Group} |
| GPS location | 20 bit |
| Angular location(x, y, z) | 30 bit |
| Location height | 10 bit |
| reserved | 12 bit |
| Measurement Time | 20 bit |

At step S1605, based on the information necessary for beam pattern determination received from the terminal, the base station may determine a candidate beam pattern. As an example, based on sensor information and beam pattern information with small effect of residual SI, which the base station receives from the terminal, the base station may select the candidate beam pattern among transmission beam patterns of the terminal. As an example, based on sensor information received from the terminal and including GPS location information of the terminal and gyroscope azimuth information, the base station may determine a beam pattern not directed to another terminal as a candidate beam pattern. Herein, the base station may determine a candidate beam index, a beam switching interval, and a number of beam switching candidates. A number of candidate beam patterns may be different according to the arrangement information and location information of terminals, which the base station identifies based on sensor information.

At step S1607, the base station may transmit information on the determined candidate beam pattern to the terminal. As an example, the base station may transmit, to an aggressor terminal, information on a candidate beam index, a beam switching interval and a number of beam switching candidates. In addition, the base station may request the terminal to switch beams based on the information on the candidate beam pattern. As an example, the base station may set a beam switching request IE to true and transmit it to a terminal to which the base station will request beam switching. Table 4 below illustrates beam switching parameters transmitted to a terminal in a beam switching request.

TABLE 4

| IE | Value |
| --- | --- |
| Beam switching request | True or False |
| Candidate Beam Index | 1024 bit |
| Beam switching interval | 10 bit |
| Number of Beam switching candidate | 10 bit |

A bit size set for each parameter may be various.

As an example, the base station may monitor a time interval between a time of requesting beam switching to a terminal and a time stamp of sensor information received from the terminal. When the time interval exceeds a random time, the base station may determine that the sensor information is not valid measurement data. When the base station determines a candidate beam index, the base station may exclude a candidate beam index determined based on the sensor information which is determined not to be valid.

At step S1609, the terminal may perform measurement for a beam pattern based on the received information the candidate beam pattern. As an example, an aggressor terminal, which receives a beam switching request message from the base station, may change a transmission beam pattern by using a candidate beam index. An aggressor terminal, which transmits a beam by changing a beam pattern, may measure residual SI for each candidate beam. In this case, a victim terminal, which does not receive a beam pattern switching request message, may measure CLI for a candidate beam that the aggressor terminal sequentially transmits.

At step S1600 and at step S1613, a terminal may transmit measurement information to the base station. As an example, an aggressor terminal may transmit residual SI information, which the aggressor terminal measured for a candidate beam transmitted by it, to the base station. In addition, a victim terminal may transmit CLI information, which is measured for the candidate beam transmitted by the aggressor terminal, to the base station. Table 5 below illustrates information on residual SI and CLI measurements transmitted to the base station. The step S1611 and the step S1613 may be implemented simultaneously, and their order may be changed.

TABLE 5

| IE | Value |
| --- | --- |
| UE index | 10 bit |
| Candidate Beam Index | 1024 bit |
| SI report | 10 bit |
| CLI report | 10 bit |

At step S1615, the base station may determine a beam pattern based on measurement information received from a terminal. As an example, the base station may determine a beam pattern minimizing inference effects among candidate beam patterns based on residual SI and CLI measurements received from each terminal within a group.

At step S1617, the base station may transmit information on the determined beam pattern to a terminal. As an example, the base station may select a beam pattern minimizing interference effects among candidate beam patterns based on residual SI measurement information and CLI measurement information. The base station may transmit information on the selected beam pattern to an aggressor terminal. When receiving the information on the determined beam pattern, the aggressor terminal may perform uplink transmission by using the determined beam pattern.

Figure 17:
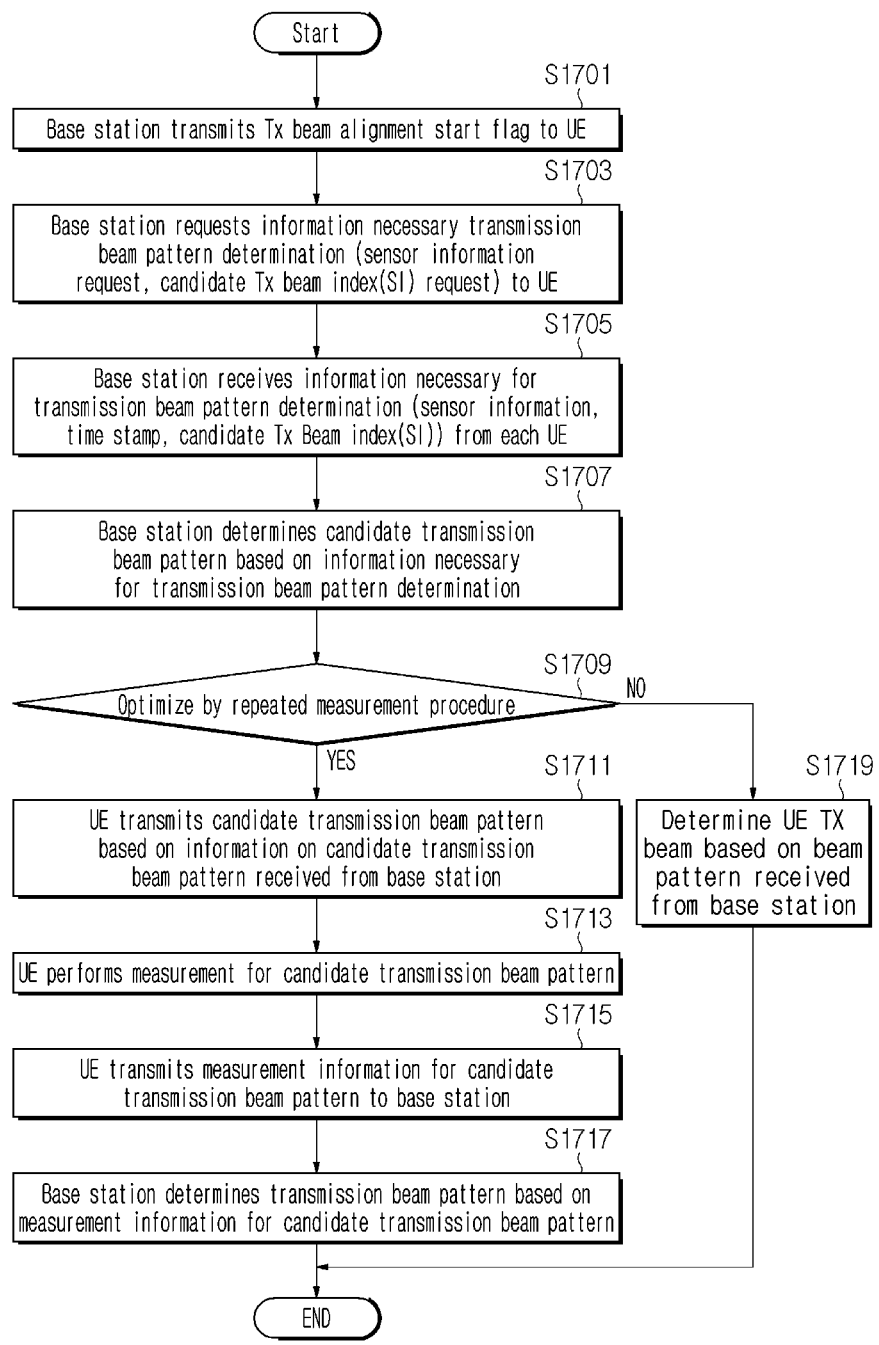
FIG. 17 illustrates an example of procedure for determining a beam pattern minimizing interference effects according to an embodiment of the present disclosure.

FIG. 17 illustrates an example of procedure for determining a beam pattern minimizing interference effects according to an embodiment of the present disclosure.

Referring to FIG. 17, at step S1701, a base station may transmit a Tx beam alignment flag to terminals and thus notify each terminal that adjustment for a transmission beam pattern will start.

At step S1703, the base station may request information necessary for transmission beam pattern determination to each terminal. As an example, the base station may request sensor information. In addition, the base station may request information on a transmission beam with residual SI at a predetermined level or lower to each terminal. The information on the transmission beam with residual SI at a predetermined level or lower may include a candidate Tx beam index (SI).

At step S1705, the base station may receive the information necessary for transmission beam pattern determination from a terminal. The information necessary for transmission beam pattern determination may include information on transmission beam candidates, of which the residual SI values are equal to or lower than a random threshold, sensor information and a time stamp of the measured sensor information, which are received from the terminal. Herein, in the case of sensor information that is delayed in time based on a time stamp of the sensor information, it may be used to determine a beam pattern by reducing its importance or weight.

At step S1707, based on the information necessary for transmission beam pattern determination received from the terminal, the base station may determine a candidate transmission beam pattern. As an example, the base station may determine the candidate transmission beam pattern based on sensor information and transmission beam information with residual SI at a predetermined level or lower. The base station may transmit the determined candidate transmission beam pattern to the terminal.

At step S1709, the base station repeatedly receives information necessary for transmission beam pattern determination, which the terminal measures, from the terminal, so that the base station may optimize information necessary for transmission beam pattern determination for minimizing interference. As an example, the base station may repeatedly receive information necessary for transmission beam pattern determination from the terminal and may determine a candidate transmission beam pattern by calculating a transmission beam pattern capable of minimizing interference based on the received information. In some cases, the base station may not repeatedly receive information necessary for transmission beam pattern determination, and in such cases, as shown in the step S1719, the base station may determine a transmission beam only based on sensor information received from the terminal and may end the beam selection procedure. That is, the base station may determine a transmission beam pattern based on sensor information without measurement result for a candidate beam pattern. The step S1709 and the step S1719 may be skipped.

At the step S1711, a terminal within a group, which receives information on a candidate transmission beam pattern from the base station, may transmit a beam according to the candidate transmission beam pattern. As an example, the base station may transmit, to each terminal, information on candidate transmission beam patterns selected based on sensor information selected from terminals. Each terminal may sequentially transmit a beam according to a received candidate transmission beam pattern.

At step S1713, a terminal may perform measurement for a candidate transmission beam pattern. As an example, an aggressor terminal, which receives information on a candidate transmission beam pattern, may sequentially transmit a candidate transmission beam pattern and measure residual SI for the transmitted candidate beam pattern. A victim terminal, which does not receive any information on a candidate transmission beam pattern, may measure CLI for a candidate transmission beam pattern of the aggressor terminal, which is sequentially transmitted.

At step S1715, when every terminal within a group finishes the measurement process of the step S1713, each terminal may transmit measurement information to the base station. The processes in the step S1711 to the step S1715 may be repeated until every terminal in the group has performed measurement for a candidate transmission beam pattern.

At step S1717, the base station may determine an appropriate transmission beam pattern for each terminal by considering an operation mode of each terminal, notify each terminal of the transmission beam pattern and complete the procedure for selecting a transmission beam pattern. As an example, when measured values of terminals for candidate transmission beam patterns are all reported to the base station, the base station may determine a transmission beam pattern minimizing interference effects among the candidate transmission beam patterns based on the measurement results. The procedure for selecting a transmission beam pattern may be performed periodically or aperiodically.

Figure 18:
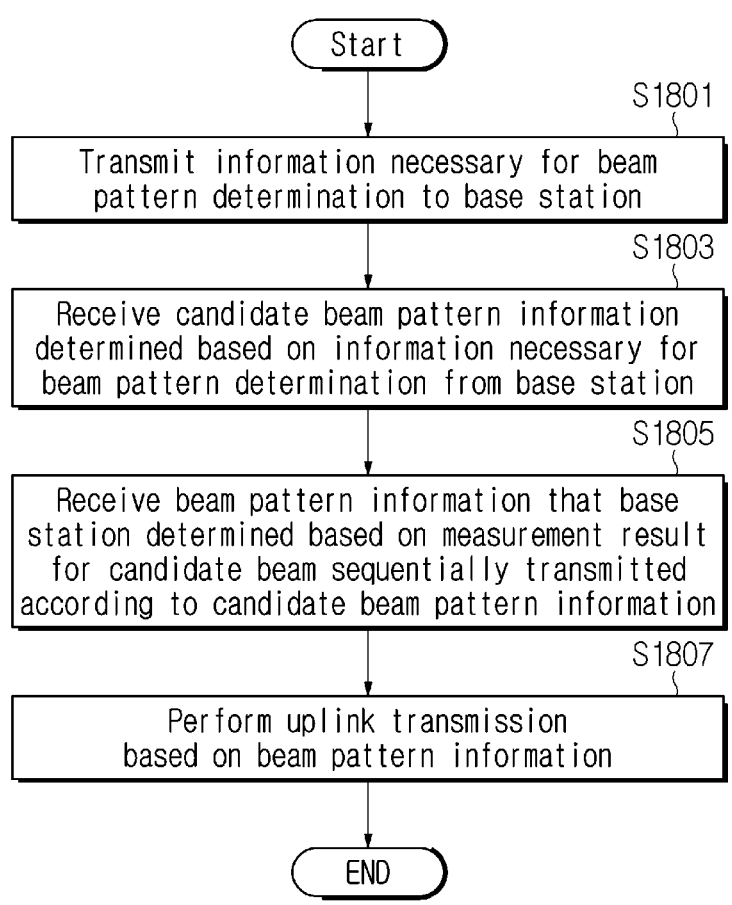
FIG. 18 illustrates an example of procedure for operating a terminal for determining a beam pattern minimizing interference effects according to an embodiment of the present disclosure.

FIG. 18 illustrates an example of procedure for operating a terminal for determining a beam pattern minimizing interference effects according to an embodiment of the present disclosure.

Referring to FIG. 18, at step S1801, a terminal may transmit information necessary for beam pattern determination to a base station. As an example, the terminal may transmit sensor information of the terminal to the base station based on a request of the base station for information necessary for beam pattern determination. As an example, the sensor information may include GPS location information of the terminal, gyroscope azimuth information, and information on a beam pattern with SI at a predetermined level or lower, which is measured by the terminal.

At step S1803, the terminal may receive, from the base station, candidate beam pattern information determined based on the information necessary for beam pattern determination. As an example, the base station may identify an arrangement condition of terminals within a group by using the GPS location information of the terminal and the gyroscope azimuth information. Based on the arrangement condition of terminals thus identified, the base station may check a beam pattern having an interference effect according to a beam direction of each terminal. Based on a checking result, the base station may determine candidate beam patterns by excluding a beam pattern having an interference effect and transmit candidate beam pattern information to a terminal. As an example, the terminal may receive information on a candidate beam pattern with SI at a predetermined level or lower from the base station.

At step S1805, beam pattern information, which the base station determines based on measurement results for candidate beams sequentially transmitted according to the candidate beam pattern information, may be received from the base station. As an example, a measurement result may be residual SI information measured for a candidate beam that an aggressor terminal transmits according to the candidate beam pattern information. As an example, a measurement result may be CLI information that a victim measures for a candidate beam transmitted from an aggressor terminal. The base station may determine a beam pattern minimizing interference effects based on measurement results of each terminal for candidate beams that an aggressor terminal sequentially transmits. The base station may transmit information on the beam pattern thus determined to the aggressor terminal.

At step S1807, the terminal may perform uplink transmission based on the determined beam pattern information. That is, the terminal may receive the determined beam pattern information from the base station and perform uplink transmission according to the beam pattern information.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 19:
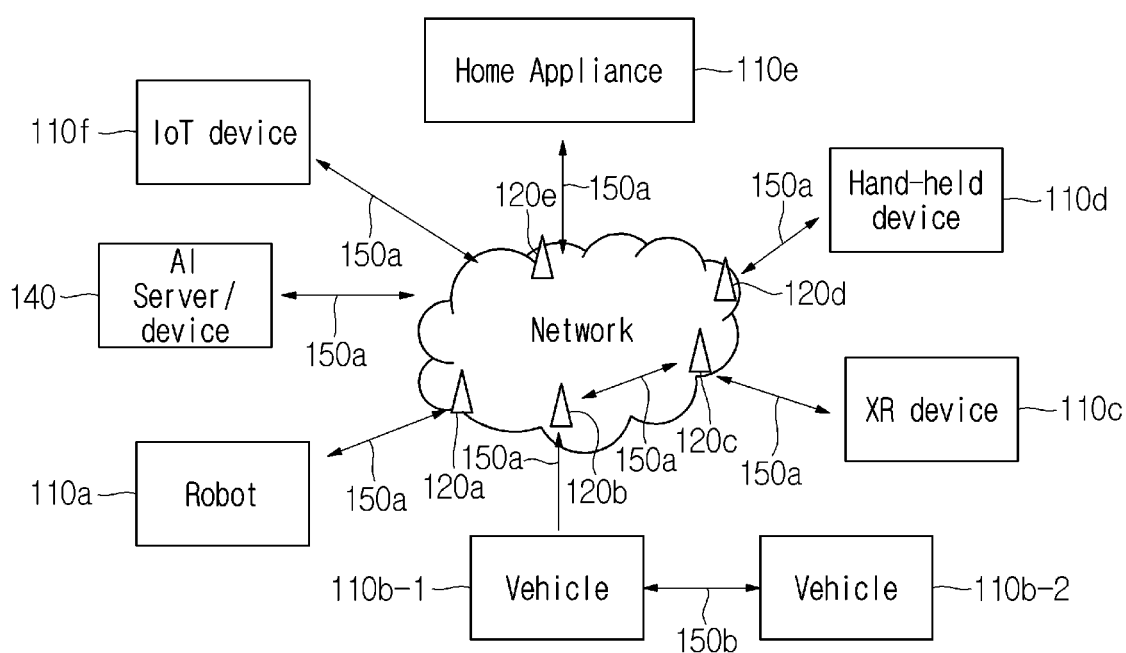
FIG. 19 illustrates an example of a communication system according to an embodiment of the present disclosure.

FIG. 19 illustrates an example of a communication system according to an embodiment of the present disclosure. The embodiment of FIG. 19 may be combined with various embodiments of the present disclosure.

Referring to FIG. 19, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110a, vehicles 110b-1 and 110b-2, an extended reality (XR) device 110c, a hand-held device 110d, a home appliance 110e, an Internet of Thing (IoT) device 110f or an artificial intelligence (AI) device/server 110g. For example, the vehicle may include a vehicle having a wireless communication function, an autonomous vehicle, a vehicle capable of performing vehicle-to-vehicle communication or the like. Here, the vehicles 110b-1 and 110b-2 may include an unmanned aerial vehicle (UAV) (e.g., drone). The XR device 110c may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110d may include a smartphone, a smart pad, a wearable device (e.g., a smartwatch or smart glasses), a computer (e.g., a laptop, etc.), etc. The home appliance 110e may include a TV, a refrigerator, a washing machine, etc. The IoT device 110f may include a sensor, a smart meter, etc. For example, the base stations 120a to 120e and the network may be implemented by a wireless device, and the specific wireless device 120a may operate as a base station/network node for the other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110a to 110f of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110a to 110f of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110a to 110f may be connected to the network through the base station 120a to 120e. AI technology is applicable to the wireless devices 110a to 110f, and the wireless devices 110a to 110f may be connected to the AI server 110g through the network. The network may be configured using a 3G network, a 4G (e.g., LTE) network, a 5G (e.g., NR) network, etc. The wireless devices 110a to 110f may communicate with each other through the base station 120a to 120e/network, or may perform direct communication (e.g., sidelink communication) without the base station 120a to 120e/network. For example, the vehicles 110b-1 and 110b-2 may perform direct communication (e.g., V2V (vehicle to vehicle)/V2X (vehicle to everything) communication). In addition, the IoT device 110f (e.g., a sensor) may perform direct communication with another IoT device (e.g., a sensor) or the other wireless devices 110a to 110f.

Wireless communication/connection 150a, 150b or 150c may be performed/established between the wireless devices 110a to 110f/base station 120a to 120e and the base station 120a to 120e/base station 120a to 120e. Here, wireless communication/connection may be performed/established through various radio access technologies (e.g., 5G NR) such as uplink/downlink communication 150a, sidelink communication 150b (or D2D communication) or BS-to-BS communication 150c (e.g., relay or integrated access backhaul (IAB)). The wireless device and the base station/wireless device or the base station and the base station may transmit/receive radio signals to/from each other through wireless communication/network 150a, 150b or 150c. For example, wireless communication/network 150a, 150b or 150c may enable signal transmission/reception through various physical channels. To this end, based on various proposes of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 20:
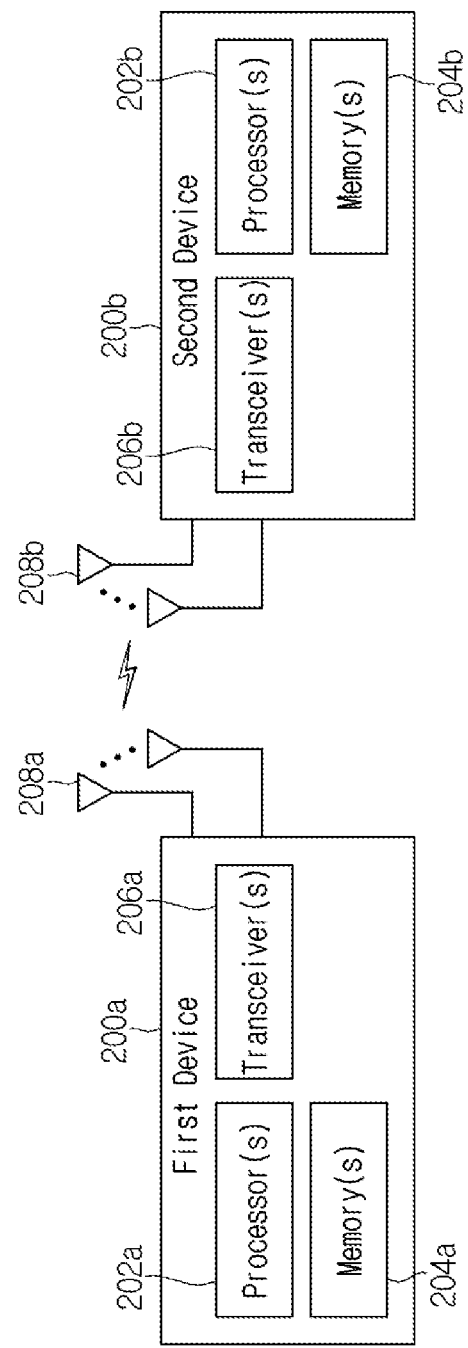
FIG. 20 illustrates an example of a wireless device according to an embodiment of the present disclosure.

FIG. 20 illustrates an example of a wireless device according to an embodiment of the present disclosure.

Referring to FIG. 20, a first wireless device 200a and a second wireless device 200b may transmit/receive radio signals through various radio access technologies (e.g., LTE or NR). Here, {the first wireless device 200a and the second wireless device 200b} may correspond to {the wireless device 110x and the base station 120x} and/or {the wireless device 110x and the wireless device 110x} of FIG. 1.

The first wireless device 200a includes one or more processors 202a and one or more memories 204a and may further include one or more transceivers 206a and/or one or more antennas 208a. The processor 202a may be configured to control the memory 204a and/or the transceiver 206a and to implement the descriptions, functions, procedures, proposes, methods and/or operation flowcharts disclosed in the present disclosure. For example, the processor 202a may process information in the memory 204a to generate first information/signal and then transmit a radio signal including the first information/signal through the transceiver 206a. In addition, the processor 202a may receive a radio signal including second information/signal through the transceiver 206a and thus store information obtained from signal processing of the second information/signal in the memory 204a. The memory 204a may be connected to the processor 202a to store a variety of information related to operation of the processor 202a. For example, the memory 204a may perform some or all of the processes controlled by the processor 202a or store software code including commands for performing the descriptions, functions, procedures, proposes, methods and/or operation flowcharts disclosed in the present disclosure. Here, the processor 202a and the memory 204a may be a portion of a communication modem/circuit/chip designed to implement wireless communication technology (e.g., LTE or NR). The transceiver 206a may be connected to the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may mean a communication modem/circuit/chip.

The second wireless device 200b performs wireless communication with the first wireless device 200a, includes one or more processors 202b and one or more memories 204b and may further include one or more transceivers 206b and/or one or more antennas 208b. The functions of the one or more processors 202b, the one or more memories 204b, the one or more transceivers 206b and/or the one or more antennas 208b are similar to those of the one or more processors 202a, the one or more memories 204a, the one or more transceivers 206a and/or the one or more antennas 208a of the first wireless device 200a.

Hereinafter, the hardware elements of the wireless devices 200a and 200b will be described in greater detail. Although not limited thereto, one or more protocol layers may be implemented by one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), messages, control information, data or information according to the descriptions, functions, procedures, proposes, methods and/or operation flowcharts disclosed in the present disclosure. The one or more processors 202a and 202b may generate and provide signals (e.g., baseband signals) including the PDUs, the SDUs, the messages, the control information, the data or the information to the one or more transceivers 206a and 206b according to the functions, procedures, proposes and/or methods disclosed in the present disclosure. The one or more processors 202a and 202b may receive signals (e.g., baseband signals) from one or more transceivers 206a and 206b to obtain the PDUs, the SDUs, the messages, the control information, the data or the information according to the descriptions, functions, procedures, proposes, methods and/or operation flowcharts disclosed in the present disclosure.

The one or more processors 202a and 202b may be referred to as controllers, microcontrollers or microcomputers. The one or more processors 202a and 202b may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202a and 202b. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202a and 202b or stored in the one or more memories 204a and 204b and driven by the one or more processors 202a and 202b. The descriptions, functions, procedures, proposes, methods and/or operation flowcharts disclosed in the present disclosure may be implemented using firmware or software in the form of code, a command and/or a set of commands.

The one or more memories 204a and 204b may be connected to the one or more processors 202a and 202b to store various types of data, signals, messages, information, programs, code, instructions and/or commands. The one or more memories 204a and 204b may include a ROM (read only memory), a RAM (random access memory), an EPROM (erasable programmable read only memory), a flash memory, a hard drive, a register, a cache memory, a computer-readable storage medium and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit, to one or more other devices, user data, control information, radio signals/channels, etc. described in the methods and/or operation flowcharts of the present disclosure. The one or more transceivers 206a and 206b may receive, from one or more other devices, user data, control information, radio signals/channels, etc. described in the descriptions, functions, procedures, proposes, methods and/or operation flowcharts disclosed in the present disclosure. In addition, the one or more transceivers 206a and 206b may be connected to the one or more antennas 208a and 208b and may be configured to transmit/receive user data, control information, radio signals/channels, etc. described in the descriptions, functions, procedures, proposes, methods and/or operation flowcharts disclosed in the present disclosure through the one or more antennas 208a and 208b. In the present disclosure, one or more antennas may be a plurality of physical antennas or a plurality of logical antennas (e.g., antenna ports). The one or more transceivers 206a and 206b may convert the received radio signals/channels, etc. from RF band signals to the baseband signals, in order to process the received user data, control information, radio signals/channels, etc. using the one or more processors 202a and 202b. The one or more transceivers 206a and 206b may convert the user data, control information, radio signals/channels, etc. processed using the one or more processors 202a and 202b from a baseband signal to an RF band signal. To this end, the one or more transceivers 206a and 206b may include an (analog) oscillator and/or a filter.

Figure 21:
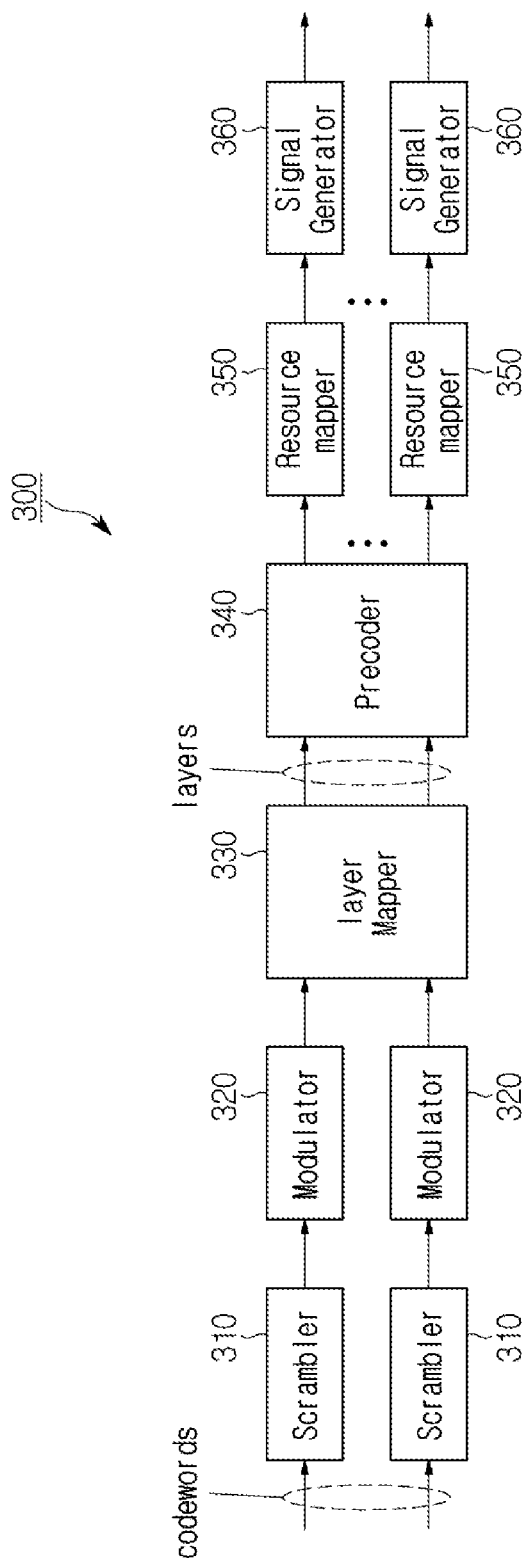
FIG. 21 illustrates a circuit for processing a transmitted signal according to an embodiment of the present disclosure.

FIG. 21 illustrates a circuit for processing a transmitted signal according to an embodiment of the present disclosure. The embodiment of FIG. 19 may be combined with various embodiments of the present disclosure.

Referring to FIG. 21, a signal processing circuit 300 may include a scrambler 310, a modulator 320, a layer mapper 330, a precoder 340, a resource mapper 350 and a signal generator 360. In this case, for example, the operation/function of FIG. 19 may be performed by the processors 202a and 202b and/or the transceivers 206a and 206b of FIG. 18. In addition, for example, the hardware element of FIG. 19 may be implemented in the processors 202a and 202b and/or the transceivers 206a and 206b of FIG. 18. For example, blocks 310 to 360 may be implemented in the processors 202a and 202b of FIG. 18. Alternatively, the blocks 310 to 350 may be implemented in the processors 202a and 202b of FIG. 18 and the block 360 may be implemented in the transceivers 206a and 206b of FIG. 18, without being limited to the above-described embodiment.

The codeword may be converted into a radio signal through the signal processing circuit 300 of FIG. 19. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 19. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK(pi/2-binary phase shift keying), m-PSK (m-phase shift keying), m-QAM(m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT)) with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 19. For example, the wireless device (e.g., 200a and 200b of FIG. 18) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a de-scrambler and a decoder.

Figure 22:
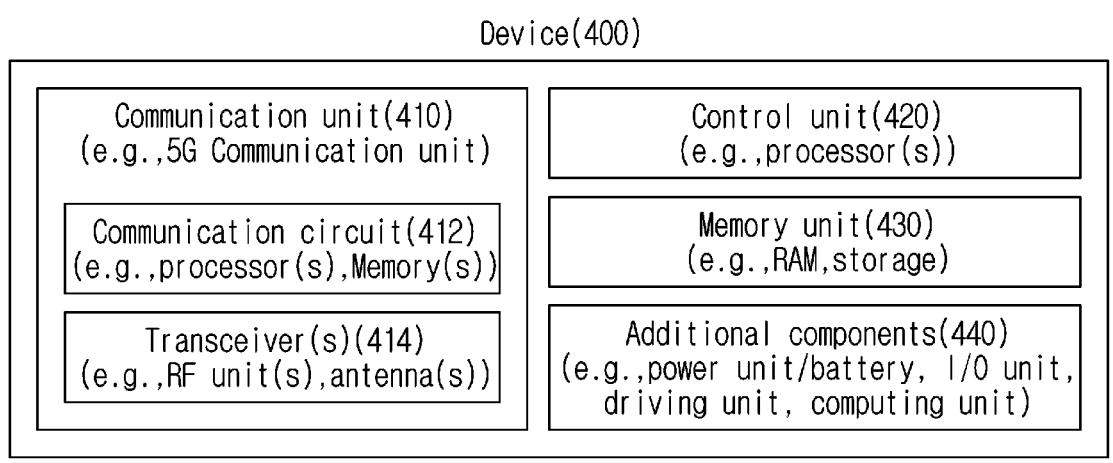
FIG. 22 illustrates another example of a wireless device according to an embodiment of the present disclosure.

FIG. 22 illustrates another example of a wireless device according to an embodiment of the present disclosure. The embodiment of FIG. 22 may be combined with various embodiments of the present disclosure.

Referring to FIG. 22, the wireless device 300 corresponds to the wireless devices 200a and 200b of FIG. 18 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202a and 202b and/or the one or more memories 204a and 204b of FIG. 18. For example, the transceiver(s) 414 may include the one or more transceivers 206a and 206b and/or the one or more antennas 208a and 208b of FIG. 18.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110a), a vehicle (FIGS. 1, 110b-1 and 110b-2), an XR device (FIG. 1, 110c), a hand-held device (FIG. 1, 110d), a home appliance (FIG. 1, 110e), an IoT device (FIG. 1, 1100, a digital broadcast terminal, a hologram device, a public safety device, an MTC device, a medical device, a Fintech device (or a financial device), a security device, a climate/environment device, an AI server/ device (FIG. 1, 140), or a network node. The wireless device is movable or may be used at a fixed place according to the use example/service.

Figure 23:
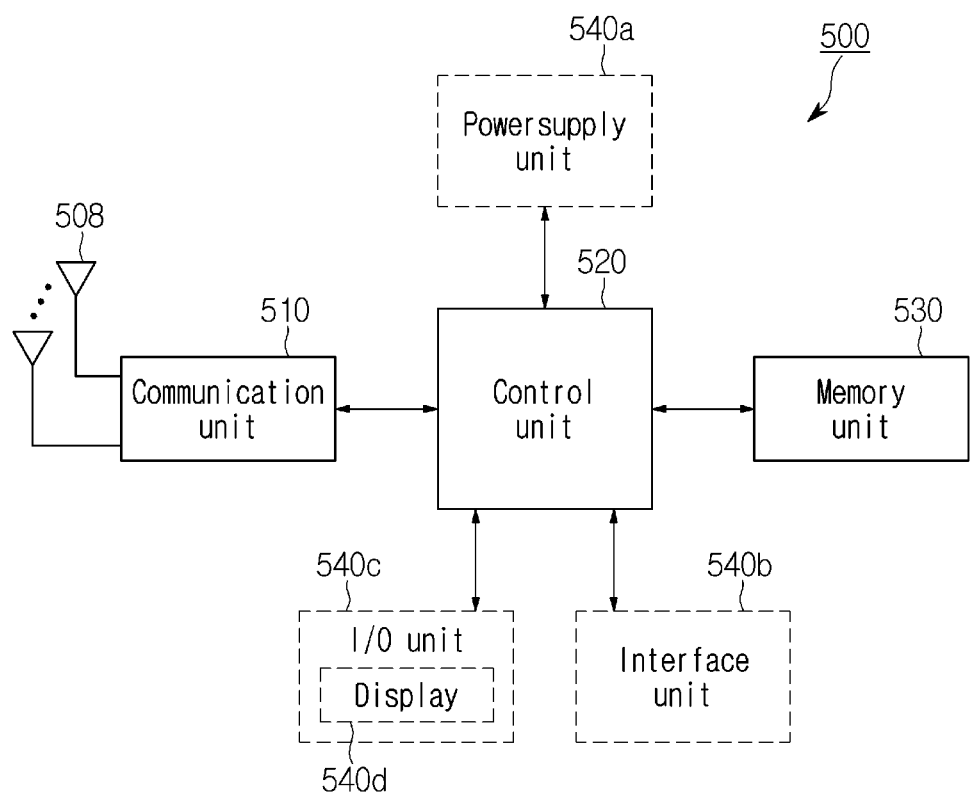
FIG. 23 illustrates an example of a hand-held device according to an embodiment of the present disclosure.

FIG. 23 illustrates an example of a hand-held device according to an embodiment of the present disclosure. FIG. 23 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 23 may be combined with various embodiments of the present disclosure.

Referring to FIG. 23, the hand-held device 500 may include an antenna unit 508, a communication unit 510, a control unit 530, a power supply unit 540a, an interface unit 540b and an input/output unit 540c. The antenna unit 508 may be a portion of the communication unit 510. Blocks 510 to 530/540a to 540c may respectively correspond to the blocks 410 to 430/440 of FIG. 20 and a repeated description thereof will be omitted.

The communication unit 510 may transmit and receive signals, the control unit 520 may control the hand-held device 500, and the memory unit 530 may store data, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output image video information/signals, audio information/signals, data and/or information received from a user. The input/output unit 540c may include a camera, a microphone, a user input unit, a display 540d, a speaker and/or a haptic module.

For example, in the case of data communication, the input/output unit 540c may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540c in various forms (e.g., text, voice, image, video or haptic).

Figure 24:
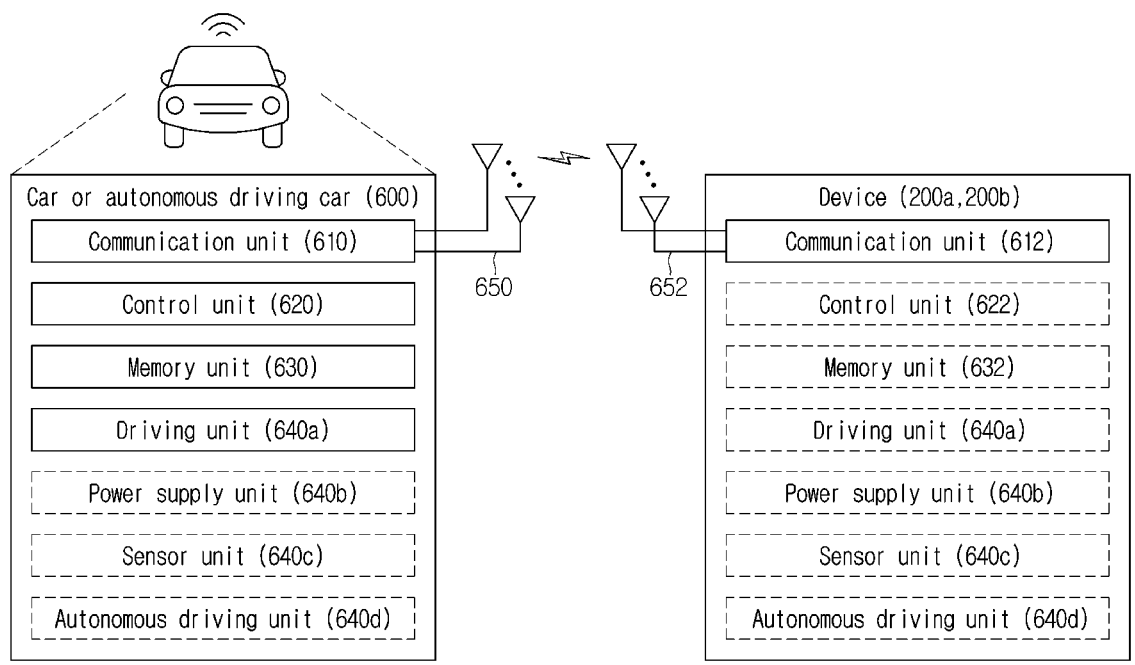
FIG. 24 illustrates an example of a vehicle or an autonomous vehicle according to an embodiment of the present disclosure.

FIG. 24 illustrates an example of a vehicle or an autonomous vehicle according to an embodiment of the present disclosure. FIG. 24 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 30 may be combined with various embodiments of the present disclosure.

Referring to FIG. 24, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 608 may be configured as a part of the communication unit 610. The blocks 610/630/640a-640d correspond to the blocks 510/530/540 of FIG. 21, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640a may cause the vehicle or the autonomous vehicle 600 to drive on a road. The driving unit 640a may include an engine, a motor, a powertrain, a wheel, a brake, a steering device, etc. The power supply unit 640b may supply power to the vehicle or the autonomous vehicle 600 and include a wired/wireless charging circuit, a battery, etc. The sensor unit 640c may obtain a vehicle state, ambient environment information, user information, etc. The sensor unit 640c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure have the following effects.

According to the present disclosure, it is possible to efficiently maintain self-interference cancellation performance of a certain level or more in a UE performing full duplex radio (FDR) communication.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Since examples of the above-described proposed method may also be included as one of the implementation methods of the present disclosure, it is obvious that they may be regarded as a kind of proposed method. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

The present disclosure may be embodied in other specific forms without departing from the technical idea and essential features described in the present disclosure. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure. In addition, the embodiments may be configured by combining claims that do not have an explicit citation relationship in the claims, or new claims may be included by amendment after the application is filed.

What is claimed is:

1. A method for operating a user equipment (UE) in a wireless communication system, the method comprising:
    generating first information;
    scrambling the first information;
    channel coding the scrambled first information to generate a codeword;
    interleaving bits of the codeword;
    performing modulation of the interleaved codeword to generate modulation symbols;
    performing an inverse fast Fourier transform (IFFT) operation and adding a cyclic prefix (CP) to generate a signal from the modulation symbols;
    transmitting, by a first UE, the signal which is generated from the first information to a base station, the first information including information necessary for beam pattern determination;
    receiving, from the base station, candidate beam pattern information determined based on the information necessary for beam pattern determination;
    receiving, from the base station, beam pattern information that the base station determined based on a measurement result for candidate beams, which are sequentially transmitted according to the candidate beam pattern information; and
    performing uplink transmission based on the determined beam pattern information,
    wherein the measurement result includes residual self-interference (SI) information measured for each of the candidate beams, which the first UE transmits, and cross link interference (CLI) information that a second UE measures for the each of the candidate beams transmitted from the first UE,
    wherein the information necessary for beam pattern determination, which is transmitted based on a request of the base station, includes at least one of sensor information or time stamp of the sensor information,
    wherein the candidate beam pattern information is determined by considering weight of the sensor information which is determined based on the time stamp.

2. The method of claim 1, wherein the first UE is a UE that has an interference effect on another UE by performing uplink transmission, and
    wherein the second UE is a UE that is subject to an interference effect due to a transmission signal of another UE.

3. The method of claim 1, wherein the information necessary for beam pattern determination includes at least one of the sensor information, which includes global positioning system (GPS) location information of the first UE and the second UE and azimuth information generated by a gyroscope, or the beam pattern information determined based on self-interference (SI).

4. The method of claim 3, wherein the beam pattern information determined based on the SI includes, among beam indexes with residual SI values that do not exceed a preset threshold among transmission beams that the first UE is capable of transmitting, information on top N transmission beams determined in an ascending order of interference effects or information on bottom N transmission beams determined in a descending order of effective interference caused by measured residual SI, and
    wherein N is an integer.

5. The method of claim 1, wherein the weight of the sensor information is lowered and is used for beam pattern determination based on a time interval between the time stamp of the sensor information and a time where the base station requests beam switching to a UE exceeds a preset time value.

6. The method of claim 1, wherein the base station determines the candidate beam pattern information by considering an interference effect degree predicted based on uplink power of the first UE and a distance between the first UE and the second UE.

7. The method of claim 1, wherein the first UE transmits the information necessary for beam pattern determination to the base station, based on receiving, from the base station, a CLI measurement start flag attribute, a sensor information request attribute and a Tx beam candidate index (SI) request attribute.

8. The method of claim 7, wherein the CLI measurement start flag attribute, the sensor information request attribute and the Tx beam candidate index (SI) request attribute are indicated by a value of either true or false.

9. The method of claim 1, wherein the first UE and the second UE are all UEs in one cell.

10. A method for operating a base station in a wireless communication system, the method comprising:
    requesting, by the base station, first information a first UE and a second UE, the first information including information necessary for beam pattern determination;
    receiving, from the first UE and the second UE, a signal generated from the first information;
    performing a fast Fourier transform (FFT) operation and removing a cyclic prefix (CP) to discompose the signal to obtain modulation symbols from the signal;
    performing demodulation of the modulation symbols to obtain bits of codeword;
    deinterleaving bits of the codeword;
    decoding the codeword to obtain scrambled first information;
    descrambling and obtaining the first information;
    determining candidate beam pattern information based on the first information;
    transmitting, to the first UE, the determined candidate beam pattern information;
    receiving, from the first UE and the second UE, measurement information for each candidate beam transmitted according to the determined candidate beam pattern information;

determining a beam pattern based on the measurement information; and transmitting, to the first UE, information on the determined beam pattern, wherein the measurement result includes residual self-interference (SI) information measured for the each candidate beam, which the first UE transmits, and cross link interference (CLI) information that a second UE measures for the each candidate beam transmitted from the first UE, wherein the information necessary for beam pattern determination, which is transmitted based on a request of the base station, includes at least one of sensor information or time stamp of the sensor information, wherein the candidate beam pattern information is determined by considering weight of the sensor information which is determined based on the time stamp.

11. A user equipment (UE) in a wireless communication system, the UE comprising:

a transceiver; and a processor coupled with the transceiver, wherein the processor is configured to:

generate first information;

scramble the first information;

perform channel coding the scrambled first information to generate a codeword;

perform interleaving bits of the codeword;

perform modulation of the interleaved codeword to generate modulation symbols;

perform an inverse fast Fourier transform (IFFT) operation and add a cyclic prefix (CP) to generate a signal from the modulation symbols;

transmit the signal which is generated from the first information to a base station, the first information including information necessary for beam determination, receive, from the base station, candidate beam pattern information determined based on the information necessary for beam pattern determination, receive, from the base station, beam pattern information that the base station determined based on a measurement result for candidate beams, which are sequentially transmitted according to the candidate beam pattern information, and perform uplink transmission based on the determined beam pattern information, wherein the measurement result includes residual self-interference (SI) information measured for each of the candidate beams, which the first UE transmits, and cross link interference (CLI) information that a second UE measures for the each of the candidate beams transmitted from the first UE, wherein the information necessary for beam pattern determination, which is transmitted based on a request of the base station, includes at least one of sensor information or time stamp of the sensor information, wherein the candidate beam pattern information is determined by considering weight of the sensor information which is determined based on the time stamp.

* * * * *